United States Patent

Narayanan

(10) Patent No.: US 10,476,988 B2
(45) Date of Patent: Nov. 12, 2019

(54) AUTOMATED CONFIGURATION SUPPORT SYSTEM

(71) Applicant: Dell Products L.P., Round Rock, TX (US)

(72) Inventor: Padmanabhan Narayanan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 299 days.

(21) Appl. No.: 15/438,447

(22) Filed: Feb. 21, 2017

(65) Prior Publication Data

US 2018/0241846 A1 Aug. 23, 2018

(51) Int. Cl.
*G06F 15/16* (2006.01)
*H04L 29/08* (2006.01)
(Continued)

(52) U.S. Cl.
CPC ........ *H04L 67/34* (2013.01); *H04L 29/06394* (2013.01); *H04L 41/026* (2013.01); *H04L 41/0876* (2013.01); *H04L 41/0883* (2013.01); *H04L 41/0889* (2013.01); *H04L 41/16* (2013.01); *H04L 51/00* (2013.01);
(Continued)

(58) Field of Classification Search
CPC .......... H04L 29/06387–06394; H04L 29/08081–08099; H04L 41/08–0806; H04L 41/0813; H04L 41/0876–0889; H04L 41/16–22; H04L 41/5061;
(Continued)

(56) References Cited

U.S. PATENT DOCUMENTS

| 8,738,739 | B2 * | 5/2014 | Makar | G06Q 10/10 709/219 |
| 9,043,407 | B1 * | 5/2015 | Gaulke | H04L 51/046 709/206 |

(Continued)

OTHER PUBLICATIONS

"Customer Experience Using the GoToAssist Corporate App for Android," Published Prior to Feb. 21, 2017, 7 Pages, GoToAssist Corporate, http://support.citrixonline.com/en_US/gotoassist+corporate/help_files/GTA110047.

(Continued)

*Primary Examiner* — Brendan Y Higa
(74) *Attorney, Agent, or Firm* — Haynes and Boone, LLP

(57) ABSTRACT

A configuration support system includes a support device having an automated support application, a network device, and a management device coupled to the network device and the support device. The management device creates a configuration session with the network device and, in response, displays a configuration window. The management device also creates a messaging session with the automated support application and, in response, displays a messaging window. The management device may then send, to the automated support application via the messaging session, data generated during the configuration session. The management device may also receive, from the automated support application via the messaging session, an automated support application command directed to the network device and execute, on the network device via the configuration session, the automated support application command.

20 Claims, 24 Drawing Sheets

(51) Int. Cl.
*H04L 12/24* (2006.01)
*H04L 29/06* (2006.01)
*H04L 12/58* (2006.01)

(52) U.S. Cl.
CPC .............. *H04L 51/18* (2013.01); *H04L 67/14* (2013.01); *H04L 67/22* (2013.01); *H04L 67/26* (2013.01)

(58) Field of Classification Search
CPC ... H04L 51/00–04; H04L 65/00; H04L 51/18; H04L 67/34
See application file for complete search history.

(56) References Cited

U.S. PATENT DOCUMENTS

| | | | |
|---|---|---|---|
| 9,521,042 B2 | 12/2016 | Narayanan et al. | |
| 2006/0150119 A1* | 7/2006 | Chesnais | G06F 16/243 715/810 |
| 2014/0122618 A1* | 5/2014 | Duan | H04L 51/02 709/206 |
| 2014/0279050 A1* | 9/2014 | Makar | G06Q 30/0269 705/14.66 |
| 2016/0294739 A1* | 10/2016 | Stoehr | H04L 51/04 |
| 2016/0313906 A1* | 10/2016 | Kilchenko | G06F 3/04847 |
| 2017/0048170 A1* | 2/2017 | Smullen | H04L 67/322 |

OTHER PUBLICATIONS

"AirDroid—Delight Your Multi-Screen Life," Published Prior to Feb. 21, 2017, 3 Pages, Sand Studio, https://www.airdroid.com/.

"WhatsApp—Use WhatsApp on Your Phone to Scan the Code," Published Prior to Feb. 21, 2017, 1 Page, https://web.whatsapp.com/.

"Messenger for Desktop—Unofficial App for Facebook Messenger, Messenger for Desktop," Published Prior to Feb. 21, 2017, 6 Pages, https://messengerfordesktop.com/.

"Provide Support for Customers Using GoToAssist Corporate for Android," Published Prior to Feb. 21, 2017, 5 Pages, GoToAssist Corporate, https://support.citrixonline.com/en_US/GoToAssist+Corporate/all_files/GTA140002.

"Host a Support Session Via Android—GoToAssist Remote Support, Host a Support Session Via Android," Published Prior to Feb. 21, 2017, 4 Pages, GoToAssist Remote Support, http://support.citrixonline.com/en_US/gotoassistremotesupport/help_files/G2ARS060003.

Padmanabhan Narayanan and Thulasi Devi Ravinanthanan, "Systems and Methods for Accelerating User Interactions on Touchscreen Devices," 70 Pages, U.S. Appl. No. 15/083,182, filed Mar. 28, 2016.

\* cited by examiner

AUTOMATED CONFIGURATION SUPPORT SYSTEM

BACKGROUND

The present disclosure relates generally to information handling systems, and more particularly to a system for providing automated support for the configuration of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, often require configuration in order to operate in a desired manner, or to correct issues with their current operation. In many situations, an administrator or user configuring the networking device may need help or support in performing that configuration. One type of support solution that is becoming more and more prevalent is the use of automated configuration support computer programs called "chatbots" that are configured to conduct a simulated human conversation via instant messaging applications in order to provide the help/support needed to configure the networking device. However, the conventional use of chatbot support systems raises a number of issues.

For example, a user configuring a networking device and may begin a network management session (e.g., via a Command Line Interface (CLI) window) between the networking device and their laptop/notebook computer. When configuring a new device or feature, or while experiencing trouble configuring the networking device, the user may then initiate an instant messaging session on their mobile phone with the chatbot support system, and may mirror that instant messaging session on the laptop/notebook computer. The chatbot support system may then send messages during the instant messaging session that request information from the user, and the user may respond by, for example, cutting information from the CLI window used in the network management session being conducted for the networking device, and pasting that information into the instant messaging session. In addition, the user may send queries to the chatbot support system via the instant messaging session, and the chatbot support system may respond to those queries via instant messaging system. Upon receiving the chatbot support system responses, the user must then interpret those responses and translate them into meaningful commands that may be entered into the CLI window used in the network management session in order to attempt to configure the networking device. Such conventional chatbot support systems are time consuming and error prone, requiring the user to interpret messages from a chatbot that may not have a clear view of the network device or the actions the user is currently taking in an attempt to configure that network device.

Accordingly, it would be desirable to provide an improved configuration support system.

SUMMARY

According to one embodiment, an Information Handling System (IHS) includes a communication subsystem, a processing system that is coupled to the communication subsystem; and a memory system that is coupled to the processing system and that includes instruction that, when executed by the processing system, cause the processing system to provide a management engine that is configured to: create a configuration session with a network device and, in response, provide a configuration window for display; create a messaging session with an automated support application and, in response, provide a messaging window for display; send, through the communication subsystem and to the automated support application via the messaging session, data generated during the configuration session; receive, through the communication subsystem and from the automated support application via the messaging session, an automated support application command directed to the network device; and execute, through the communication subsystem and on the network device via the configuration session, the automated support application command.

BRIEF DESCRIPTION OF THE DRAWINGS

FIG. 21 is a screen shot illustrating an embodiment of a first CLI window displayed on the primary management device in the configuration support system of FIG. 9 during the method of FIG. 8.

FIG. 22 is a screen shot illustrating an embodiment of a first CLI window displayed on the primary management device in the configuration support system of FIG. 9 during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
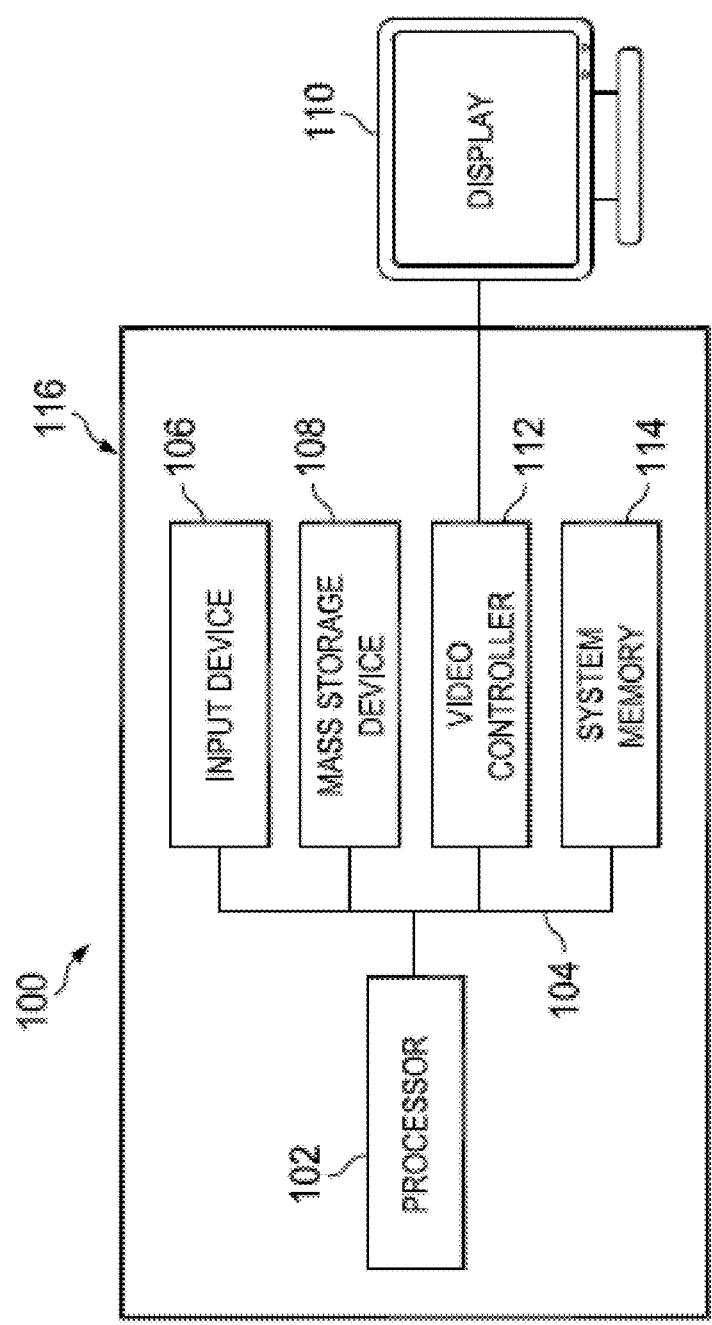
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
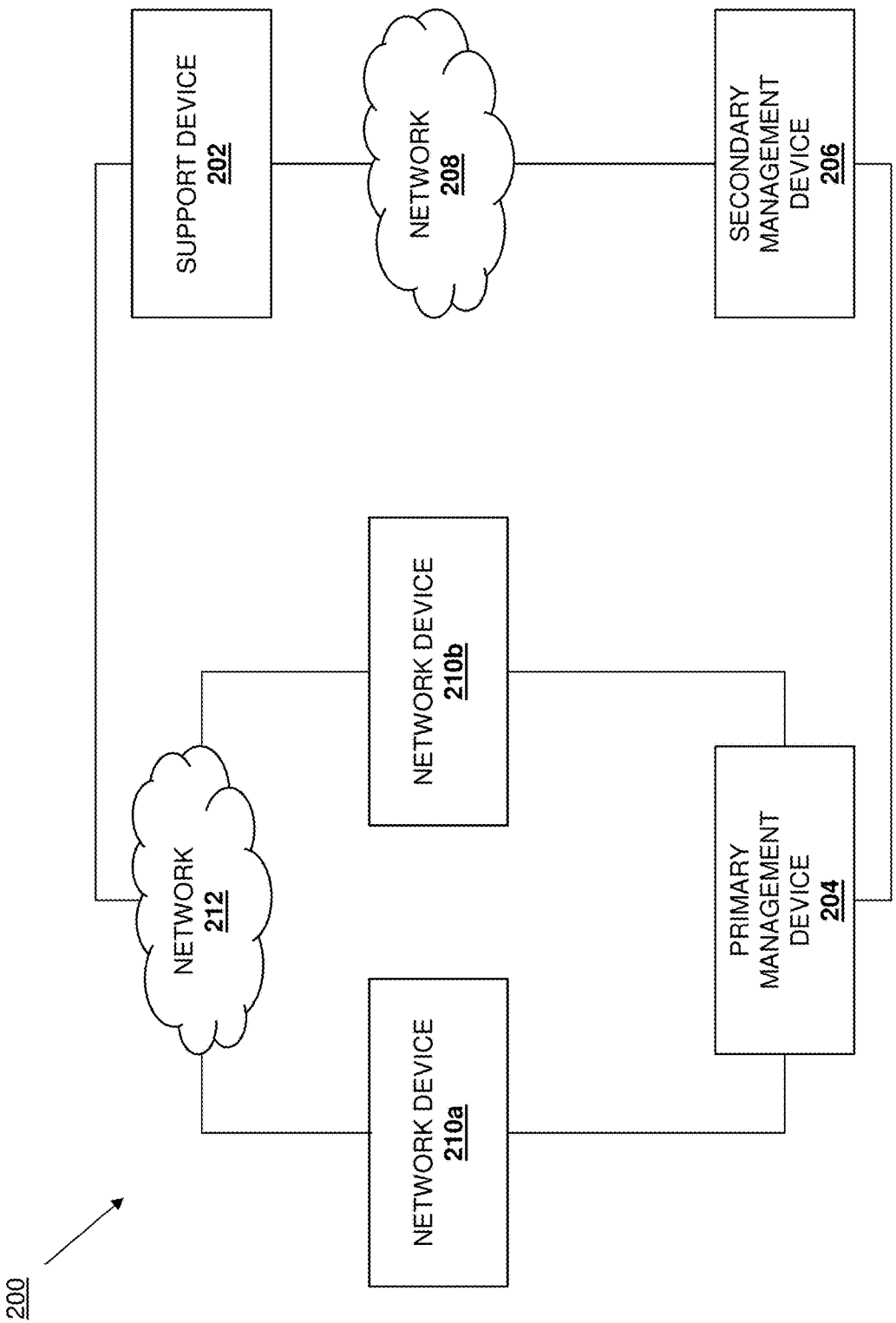
FIG. 2 is a schematic view illustrating an embodiment of a configuration support system.

Referring now to FIG. 2, an embodiment of a configuration support system 200 is illustrated. While the embodiment illustrated in FIG. 2 provides an example of the use of the configuration support system 200 of the present disclosure in supporting the configuration of pair of network devices, one of skill in the art in possession of the present disclosure will recognize that support may be provided for the configuration of different numbers of devices, a variety of different types of device, and a variety of different orientations of devices, while remaining within the scope of the present disclosure. The configuration support system 200 includes a "support side" that may include elements provided by a support entity such as, for example, a product manufacturer, a product vendor, a third-party support entity, and/or other support providers known in the art. In the illustrated embodiment, the support side of the configuration support system 200 includes a support device 202 that may be the IHS 100 discussed above with reference to FIG. 1, and/or that may include some or all of the components of the IHS 100. For example, the support device 202 may be provided as part of a Technical Assistance Center (TAC) that may include combinations of servers and/or other subsystems that are configured to provide support as discussed below.

The configuration support system 200 also includes a "user side" that may include elements provided by a user entity such as, for example, a product user that utilizes the support entity for supporting one or more products. The user side of the configuration support system 200 includes at least one management device that may be coupled to at least one product in order to configure that product as well as request and receive support for that product. In the illustrated embodiment, the user side includes a primary management device 204 that may be the IHS 100 discussed above with reference to FIG. 1, and/or that may include some or all of the components of the IHS 100. For example, the primary management device 204 may be a desktop computer, a laptop computer, and/or other primary management devices known in the art. In the illustrated embodiment, the user side of the configuration support system 200 also includes a secondary management device 206 that may be coupled to the primary management device 204 and that may be the IHS 100 discussed above with reference to FIG. 1, and/or that may include some or all of the components of the IHS 100. For example, the secondary management device 206 may be a tablet computer, a mobile phone, and/or other secondary management devices known in the art that may wirelessly couple to the primary management device 204 via BLUETOOTH® wireless communication techniques, Near Field Communication (NFC) wireless communication techniques, and/or other wireless communication techniques known in the art. The secondary management device 206 may also couple to the support device 202 through a network 208 such as, for example, the Internet, a Local Area Network, and/or other networks known in the art, using a cellular communication techniques, WiFi communication techniques, and/or other communication techniques known in the art.

In the illustrated embodiment, the user side of the configuration support system 200 also includes a pair of network devices 210a and 210b that may be coupled to the primary management device 204 and that each may be the IHS 100 discussed above with reference to FIG. 1, and/or that may include some or all of the components of the IHS 100. For example, the network devices may be networking devices such as switches, routers, and access points; servers; storage systems, and/or other network devices known in the art. Each of the network devices 210a and 210b may couple to the primary management device 204 via management links known in the art. The network devices 210a and 210b may also each couple to the support device 202 through a network 212 such as, for example, the Internet, a Local Area Network, and/or other networks known in the art, via out-of-band links. However, as would be appreciated by one of skill in the art in possession of the present disclosure, out-of-band communication links are often not configured by network device users and, as such, in many embodiments, the connection provided by the network 212 between the network devices 210a/210b and the support device 202 may be omitted or otherwise not utilized in the configuration support system 200.

As discussed below, the embodiment illustrated in FIG. 2 provides an example of a common management configuration in which an administrator or other user utilizes a pair of management devices for support: the primary management device 204 to provide the management connection to the device(s) being configured, and the secondary management device 206 to provide the support connection to the support system 202 to receive support in configuring the device(s). Furthermore, the embodiment illustrated in FIG. 2 provides an example of the configuration of a pair of network devices. However, one of skill in the art in possession of the present disclosure will recognize that a single management device (e.g., the primary management device 204) may be utilized alone (i.e., the secondary management device 206 may be omitted and its functionality incorporated into the primary management device 204) to provide both the management connection to the device(s) being configured as well as the support connection to the support system 202 while remaining within the scope of the present disclosure. Furthermore, one of skill in the art in possession of the present disclosure will recognize that a single network device (or more network devices than are illustrated in FIG. 2) may be configured and/or supported while remaining within the scope of the present disclosure as well.

Figure 3:
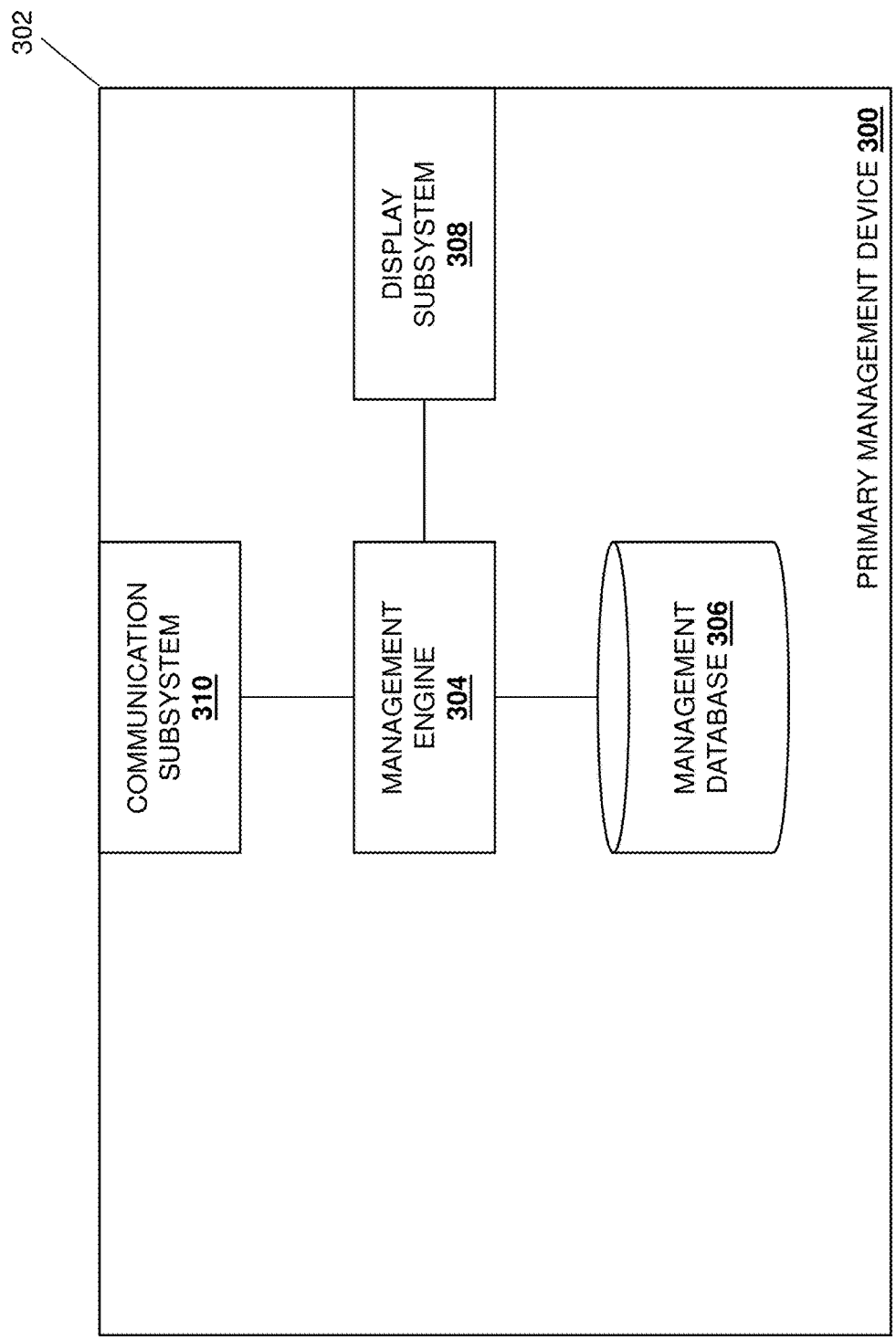
FIG. 3 is a schematic view illustrating an embodiment of a primary management device used in the configuration support system of FIG. 2.

Referring now to FIG. 3, an embodiment of a primary management device 300 is illustrated that may be the primary management device 204 discussed above with reference to FIG. 2. As such, the primary management device 300 may be the IHS discussed above with reference to FIG. 1 and/or may include some or all of the components of the IHS 100, and in specific embodiments may be provided by a desktop computer, a laptop computer, and/or other computing devices known in the art. In the illustrated embodiment, the primary management device 300 includes a chassis 302 that houses the components of the primary management device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a management engine 304 that is configured to perform the functionality of the management engine, management engine sub-engines, and primary management devices discussed below.

The chassis 302 may also house a storage system (not illustrated, but which may include the storage device 108 discussed below) that is coupled to the management engine 304 (e.g., via a coupling between the storage system and the processing system) and that includes a management database 306 that is configured to store the data that enables the functionality discussed below. The chassis 302 may also house a display subsystem 308 that is coupled to the management engine 304 (e.g., via a coupling between the display subsystem 308 and the processing system) and that is configured to display the information discussed below. The chassis may also house a communication subsystem 310 that is coupled to the management engine 304 (e.g., via a coupling between the communication subsystem 310 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a primary management device 300 has been described, one of skill in the art in possession of the present disclosure will recognize that primary management devices may be provided with a variety of other components that provide for conventional management device functionality, as well as the functionality discussed below, while remaining within the scope of the present disclosure.

Figure 4:
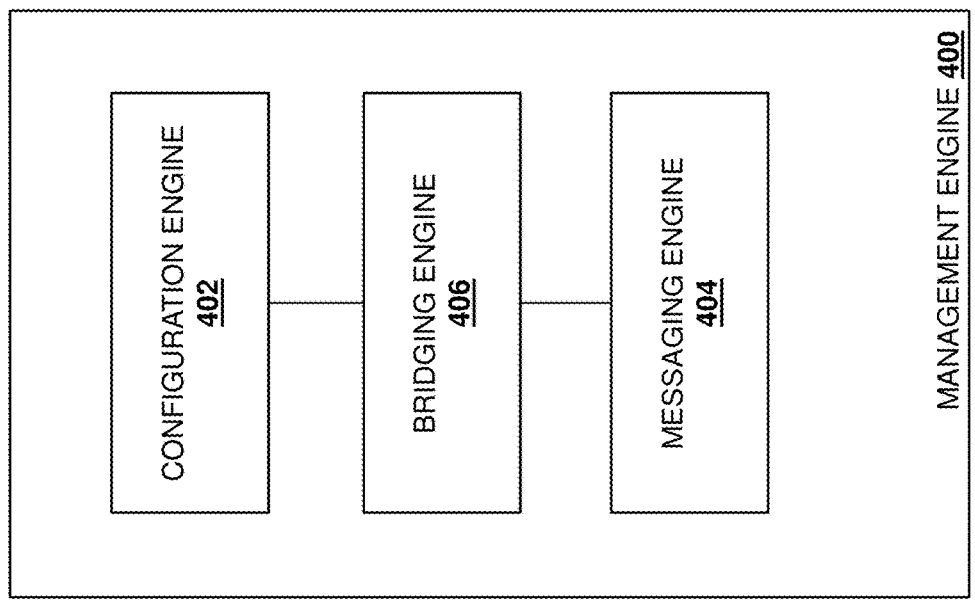
FIG. 4 is a schematic view illustrating an embodiment of a management engine used in the primary management device of FIG. 3.

Referring now to FIG. 4, an embodiment of a management engine 400 is illustrated that may be the management engine 304 in the primary management device 300 discussed above with reference to FIG. 3. As such, the management engine 400 may be provided by a processing system on a primary management device executing instructions stored on a memory system of that primary management device. In the illustrated embodiment, the management engine 400 includes a configuration engine 402 and a messaging engine 404 that are each coupled to a bridging engine 406. In an embodiment, the configuration engine 402 is configured to provide configuration sessions with network devices. In the examples below, the configuration engine 402 provides respective Command Line Interface (CLI) configuration sessions with the network devices 210a and 210b, with respective CLI configuration windows provided for display for each of those CLI configuration sessions. However, other types of configuration sessions will fall within the scope of the present disclosure as well.

In a specific example, in addition to the functionality described below, the configuration engine 402 is configured to provide a CLI configuration session as described in detail in U.S. Pat. No. 9,521,042, the inventors of which include the inventor of the present disclosure as a co-inventor. Without repeating the subject matter of that patent in detail, the configuration engine 402 may function as a "content-aware splicer" that may use knowledge about a type of a network device that is being communicated with using a CLI configuration session to facilitate and support management of the network device, parse commands entered into the CLI configuration session by a user, parse responses to the commands to infer information regarding a configuration and/or a status of the network device, use the inferred information to facilitate and support management of the network device, identify network objects associated with the network device from the parsed commands and responses, determine characteristics of the identified network objects, inject characters and/or commands into the CLI configuration session to facilitate and support management of the network device, provide the user with a list of context-specific options for use with a command being entered, use the inferred information to spawn additional context-aware graphical user interface (GUI) dialogs and/or context-aware management device windows to display the inferred information to the user, and/or provide GUI controls for managing the network device, and/or provide any of the other functionality discussed in U.S. Pat. No. 9,521,042.

In an embodiment, the messaging engine 404 is configured to mirror a messaging session that is occurring between a secondary management device and a support system. In the examples below, the messaging engine 404 is configured to mirror an instant messaging session that is occurring between the secondary management device 206 and the support system 202 in a respective instant messaging window. However, as discussed below, the provisioning of messaging sessions and messaging windows by the messaging engine 404 (e.g., when the secondary management device 206 is omitted) will fall within the scope of the present disclosure as well. Furthermore, other types of messaging sessions will fall within the scope of the present disclosure as well.

In an embodiment, the bridging engine 406 is configured to share data between the configuration sessions provided by the configuration engine 402 and the messaging sessions providing by the messaging engine 404, execute commands across the configuration sessions provided by the configuration engine 402 and the messaging sessions providing by the messaging engine 404, and/or provide any of the other bridging functionality discussed below. For example, the bridging engine 406 may be provided by an Integrated Hypermedia Engine (IHE) that operates to cause the configuration engine 402 to launch CLI configuration session(s), and links those CLI configuration session(s) to messaging sessions launched by the messaging engine 404.

Figure 5:
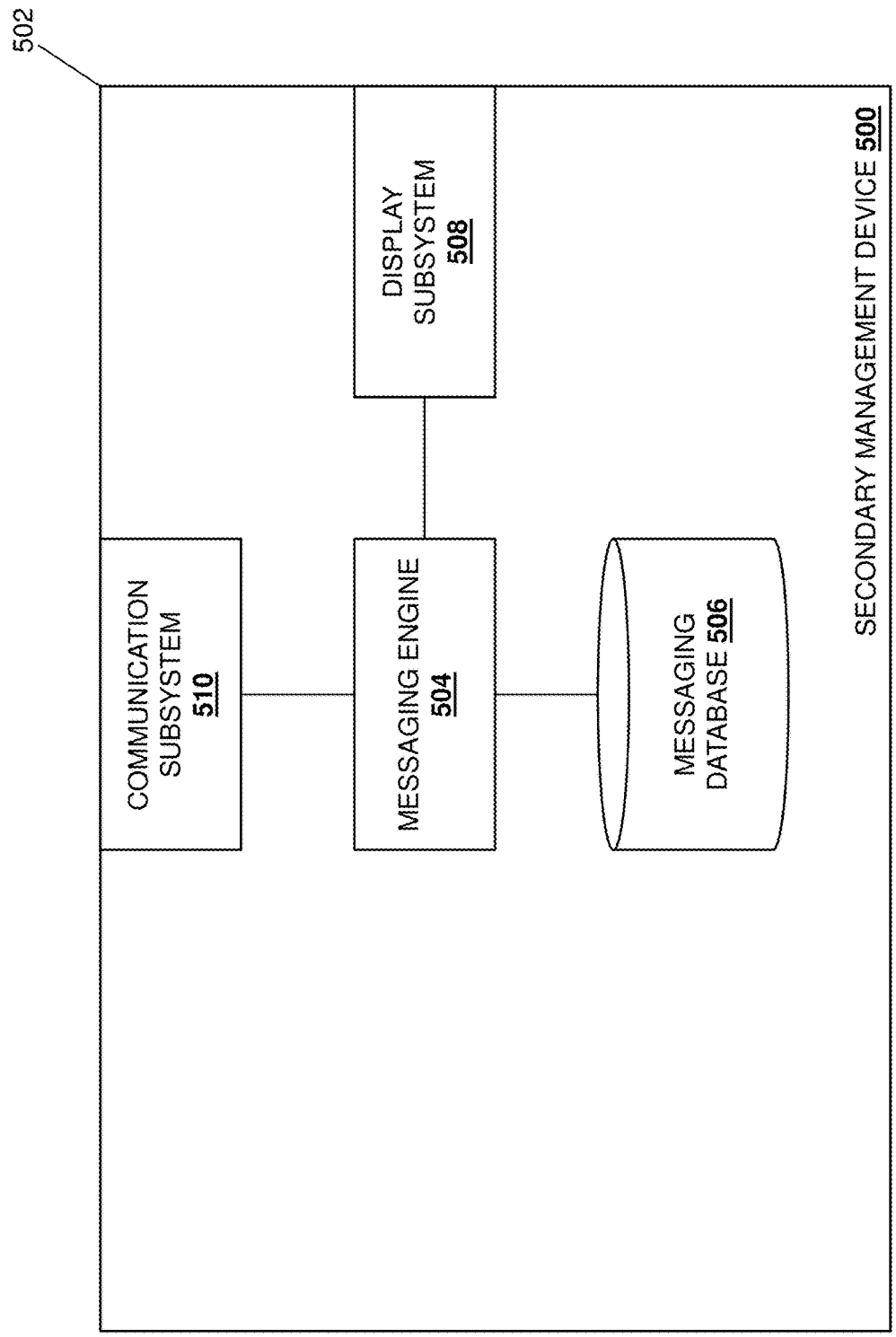
FIG. 5 is a schematic view illustrating an embodiment of a secondary management device used in the configuration support system of FIG. 2.

Referring now to FIG. 5, an embodiment of a secondary management device 500 is illustrated that may be the secondary management device 206 discussed above with reference to FIG. 2. As such, the secondary management device 500 may be the IHS discussed above with reference to FIG. 1 and/or may include some or all of the components of the IHS 100, and in specific embodiments may be provided by a tablet computer, a mobile phone, and/or other computing devices known in the art. In the illustrated embodiment, the secondary management device 500 includes a chassis 502 that houses the components of the secondary management device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a messaging engine 504 that is configured to perform the functionality of the messaging engine, messaging engine sub-engines, and secondary management devices discussed below.

The chassis 502 may also house a storage system (not illustrated, but which may include the storage device 108 discussed below) that is coupled to the messaging engine 504 (e.g., via a coupling between the storage system and the processing system) and that includes a messaging database 506 that is configured to store the data that enables the functionality discussed below. The chassis 502 may also house a display subsystem 508 that is coupled to the messaging engine 504 (e.g., via a coupling between the display subsystem 508 and the processing system) and that is configured to display the information discussed below. The chassis 502 may also house a communication subsystem 510 that is coupled to the messaging engine 504 (e.g., via a coupling between the communication subsystem 510 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a secondary management device 500 has been described, one of skill in the art in possession of the present disclosure will recognize that secondary management devices may be provided with a variety of other components that provide for conventional management device functionality, as well as the functionality discussed below, while remaining within the scope of the present disclosure.

Figure 6:
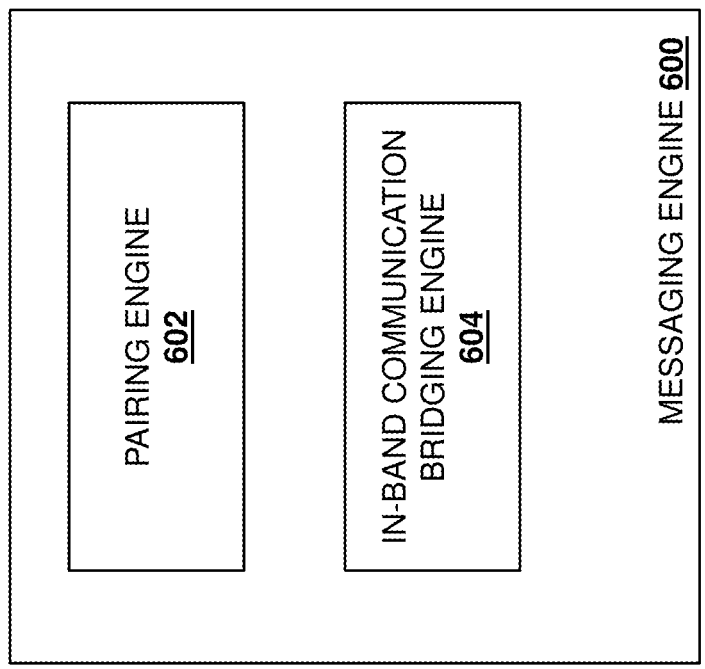
FIG. 6 is a schematic view illustrating an embodiment of messaging engine used in the secondary management device of FIG. 6.

Referring now to FIG. 6, an embodiment of a messaging engine 600 is illustrated that may be the messaging engine 504 provided on the secondary management device 500 discussed above with reference to FIG. 5. As such, the messaging engine 600 may be provided by a processing system on a secondary management device executing instructions stored on a memory system of that secondary management device. In the illustrated embodiment, the messaging engine 600 includes a pairing engine 602 for pairing the secondary management device 206/500 with the primary management device 204/300, and an in-band message bridging engine 604 that is configured to bridge communication between the support system 202 and the primary management device 204/300 as described below. In an embodiment, the messaging engine 600 is also configured to provide messaging sessions with support devices, and specifically with automated configuration support applications operating on those support devices, although other types of messaging sessions will fall within the scope of the present disclosure as well. In the examples below, the messaging engine 600 provides an instant messaging session with the support system 202. However, other types of messaging sessions will fall within the scope of the present disclosure as well.

Figure 7:
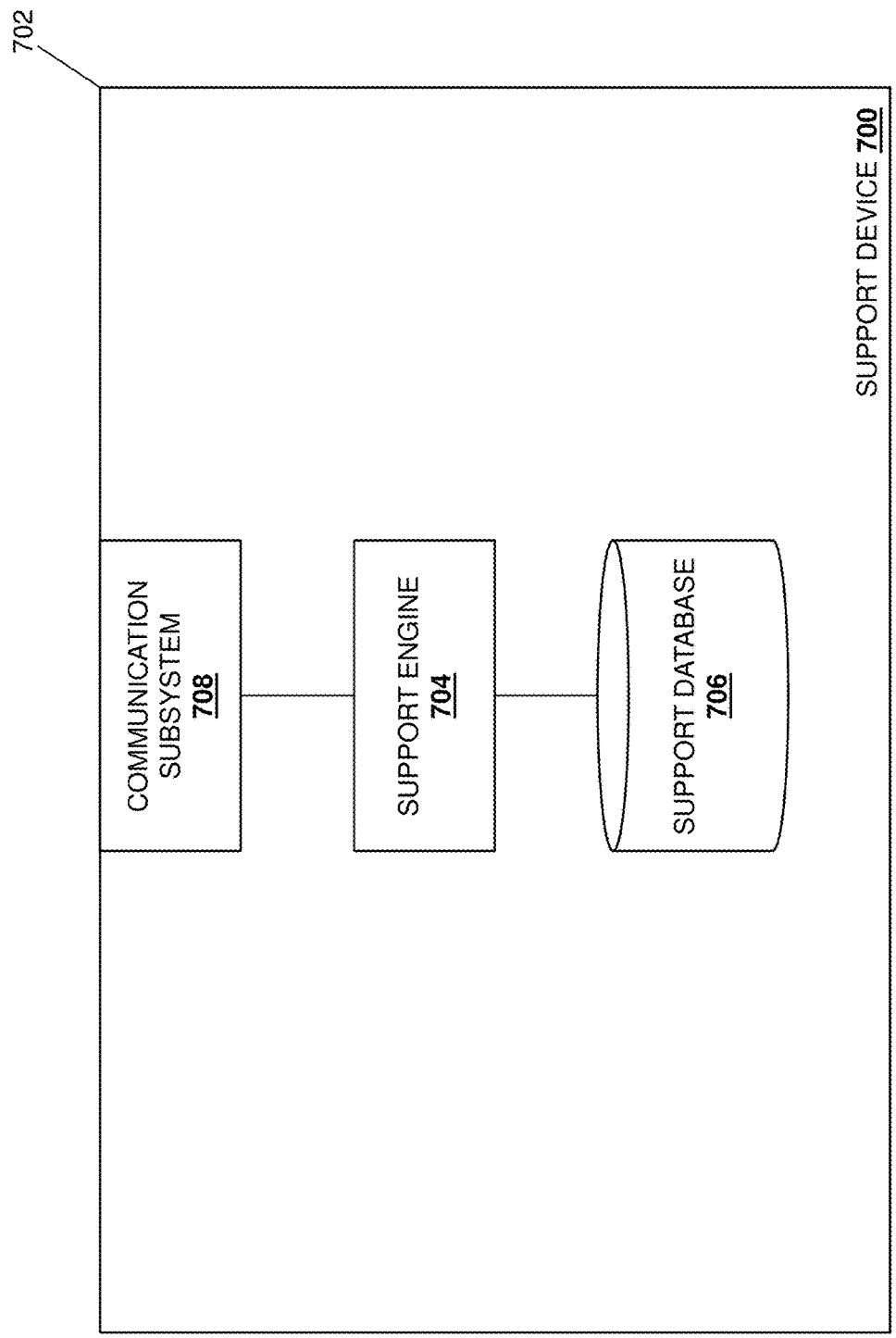
FIG. 7 is a schematic view illustrating an embodiment of a support device used in the configuration support system of FIG. 2.

Referring now to FIG. 7, an embodiment of a support device 700 is illustrated that may be the support device 202 discussed above with reference to FIG. 2. As such, the support device 700 may be the IHS discussed above with reference to FIG. 1 and/or may include some or all of the components of the IHS 100, and in specific embodiments may be provided by a server and/or other computing devices known in the art. In the illustrated embodiment, the support device 700 includes a chassis 702 that houses the components of the support device 700, only some of which are illustrated in FIG. 7. For example, the chassis 702 may house a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to provide a support engine 704 that is configured to perform the functionality of the support engines and support devices discussed below. In the examples discussed below, the support engine 704 includes an automated configuration support application that provides chatbot support, although other automated configuration support applications are envisioned as falling within the scope of the present disclosure.

The chassis 702 may also house a storage system (not illustrated, but which may include the storage device 108 discussed below) that is coupled to the support engine 704 (e.g., via a coupling between the storage system and the processing system) and that includes a support database 706 that is configured to store the data that enables the functionality discussed below. The chassis 702 may also house a communication subsystem 708 that is coupled to the support engine 704 (e.g., via a coupling between the communication subsystem 708 and the processing system) and that may include a Network Interface Controller (NIC), a wireless communication subsystem (e.g., a BLUETOOTH® communication subsystem, an NFC communication subsystem, etc.), and/or other communication components that enable the communication discussed below. While a specific embodiment of a support device 700 has been described, one of skill in the art in possession of the present disclosure will recognize that support devices may be provided with a variety of other components that provide for conventional support device functionality, as well as the functionality discussed below, while remaining within the scope of the present disclosure.

Figure 8:
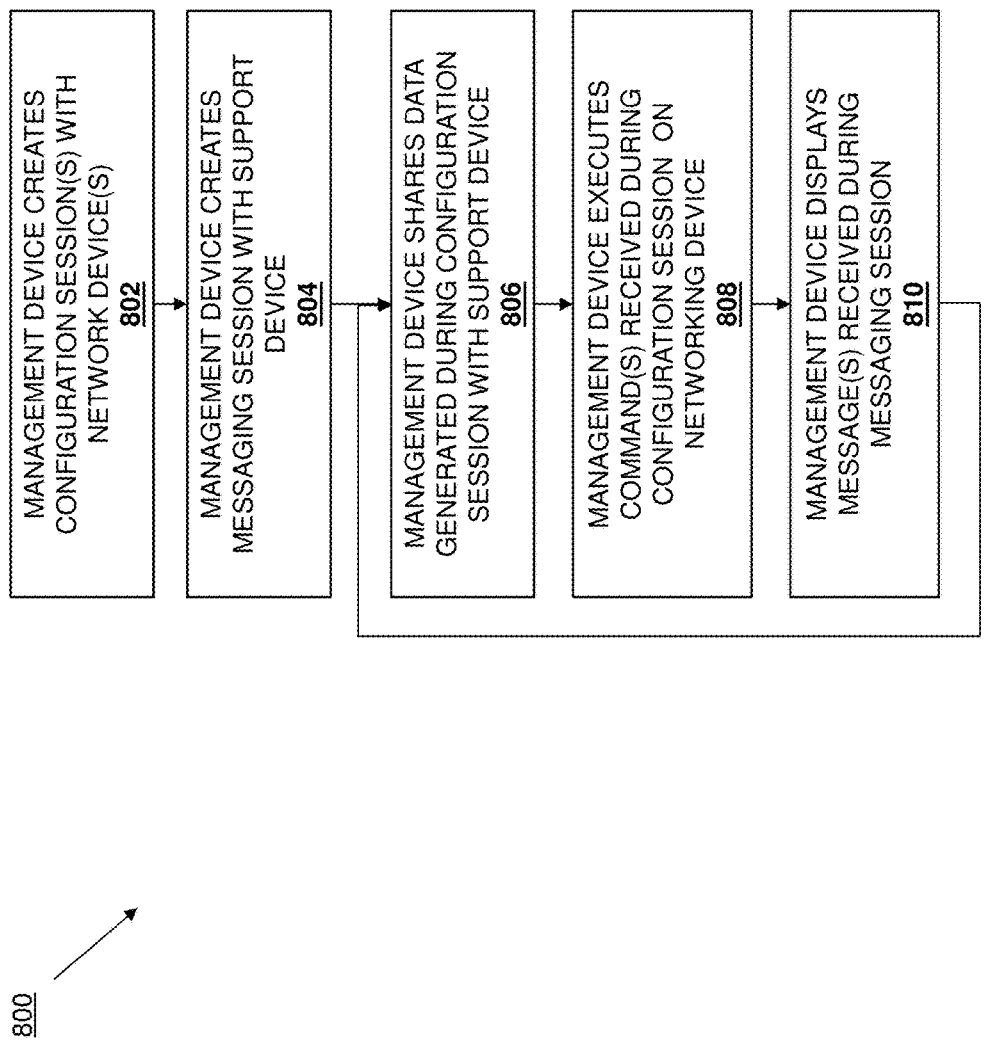
FIG. 8 is a flow chart illustrating an embodiment of a method for providing automated configuration support.

Referring now to FIG. 8, an embodiment of a method 800 for providing automated configuration support is illustrated. As discussed below, the systems and methods of the present disclosure provide in-band communication between a support device and management device(s) that are configuring network device(s). The in-band communication enables an automated configuration support application on the support device to transparently access configuration session(s) provided for the networking device(s) in order to query the network device(s), receive responses from the networking device(s), snoop user activity during the configuration session(s) to better correlate support queries from the user with the network device(s) state(s), and provide pro-active, timely, and accurate support responses to the user. The systems and methods of the present disclosure provide for more efficient support due to the automated configuration support application being provided with the user's perspective of the network device(s) (without requiring the user to execute commands in the configuration sessions and copy the responses to the messaging session) in order to get the more accurate view of the network device, via the tracking of user actions during in the configuration session and the pushing of those user actions to the support device, and the mirroring of user CLI commands and network device responses to the automated configuration support application. The discussion of the method 800 below describes this functionality generally, and is followed by several specific examples of screenshots that illustrate the benefits that may be realized when performing the general functionality described with respect to the method 800.

The method 800 begins at block 802 where a management device creates configuration sessions with network devices. With reference to FIG. 2, at block 802, a user may utilize the primary management device 204 to create a respective configuration session with each network device 210*a* and 210*b*. As such, the user may either connect the primary management device 204 to each of the network devices 210*a* and 210*b* locally (e.g., via a local wired connection between the primary management device 204 and each of the network devices 210*a* and 210*b*), or connect the primary management device 204 to each of the network devices 210*a* and 210*b* via a network. In some embodiments, the configuration sessions may be created with the network devices 210*a* and 210*b* prior to the need for any configuration support (e.g., a user may attempt to configure the networking devices 210*a* and 210*b* and, in the process, determine that support is needed). In such an embodiment, at block 802 the user may utilize the configuration engine 402 in the management engine 304/400 of the primary management device 204 to begin a first configuration session with the network device 210*a*, and begin a second configuration session with the network device 210*b*. In response, the configuration engine 402 may create a first configuration session with the network device 210*a*, and a second configuration session with the network device 210*b*, as well as provide respective configuration windows for each of the first and second configuration sessions for display on the display subsystem 308. However, in other embodiments, the user may utilize the primary management device 204 to create the configuration session(s) and the messaging session at the same time.

The method 800 then proceeds to block 804 where the management device creates a messaging session with a support device. With reference to FIG. 2, at block 802, a user may utilize the secondary management device 206 to create a support messaging session to receive support with the configuration of the networking devices 210*a* and 210*b*. As discussed above, in some embodiments the need for support may be determined subsequent to the creation of the configuration sessions, and at block 804 the user may utilize the messaging engine 504 in the secondary management device 206/500 to begin a support messaging session with the support device 202. In response to initiating that messaging session, the pairing engine 602 in the messaging engine 504/600 may operate to pair with the management engine 304/400 in the primary management device 204/300. Upon pairing, the messaging engine 404 in the management engine 304/400 of the primary management device 204/300 may operate to mirror the messaging session being conducted by the secondary management device 206 on the display subsystem 308 on the primary management device 204/300, while the bridging engine 406 may operate to link the support messaging session with the configuration sessions that were created at block 802. Upon linking the support messaging session to the configuration sessions, the bridging engine 406 may then inform the automated configuration support application in the support device 202, in-band via the messaging session, of each of the configuration sessions that are linked to the support messaging session.

Following the linking of the support messaging session with the configuration sessions, and during the method 800, the management device shares data generated during the configuration session with the support device at block 806, the management device executes commands received during the configuration session on the networking device at block 808, and the management device displays messages received during the messaging session at block 810. The details of these blocks of the method 800 may differ depending on different situations, but are enabled by the different functionality of the primary management device 204, the secondary management device 206, and the support device 202, discussed in detail below. One of skill in the art in possession of the present disclosure will appreciate from the discussion below of the functionality of the primary management device 204, the secondary management device 206, and the support device 202, as well as the examples of that functionality that follow, the many different benefits achieved during blocks 806, 808, and 810 of the method 800.

The configuration engine 402 of the management engine 304/400 in the primary management device 300 operates during the method 800 to detect inputs from the user in the configuration window(s) provided for the configuration sessions with the network devices 210a and 210b, as well as responses from the network devices 210a and 210b to those input, and mirrors that information the support device 202. For example, if the configuration engine 402 in the primary management device 300 detects a CLI command input into a CLI configuration window for a CLI configuration session with the network device 210a, the configuration engine 402 may then send that CLI command to the network device 210a. The configuration engine 402 in the primary management device 204/300 may then also mirror that CLI command through the secondary management device 206/500 and via the messaging session to the automated configuration support application in the support device 202 (e.g., via the bridging engine 406 in the primary management device 204/300 and the in-band communication bridging engine 604 in the secondary management device 206/500). The configuration engine 402 in the primary management device 300 may then also collect any CLI responses from the network device 210a and display those responses in the CLI configuration window for the network device 210a, while also mirroring those CLI responses through the secondary management device 206/500 and via the messaging session to the automated configuration support application in the support device 202 (e.g., via the bridging engine 406 in the primary management device 204/300 and the in-band communication bridging engine 604 in the secondary management device 206/500).

The configuration engine 402 of the management engine 304/400 in the primary management device 300 also operates during the method 800 to detect commands sent in-band from the automated configuration support application in the support device 202, as well as responses from the network devices 210a and 210b to those commands, while ensuring that those commands and responses are not echoed in the CLI configuration windows (i.e., to prevent cluttering of the CLI configuration windows with in-band support device/ network device communications). For example, if the configuration engine 402 in the primary management device 300 receives a command from the automated configuration support application that is directed to the network device 210a, the configuration engine 402 may switch off a CLI configuration window echo, send that command to the network device 210a, provide an indication to the automated configuration support application via the messaging session (e.g., via the bridging engine 406 in the primary management device 204/300 and the in-band communication bridging engine 604 in the secondary management device 206/ 500) that the command has been initiated, receive a response from the network device 210a, provide that response through the secondary management device 206/500 and to the automated support application via the messaging session (e.g., via the bridging engine 406 in the primary management device 204/300 and the in-band communication bridging engine 604 in the secondary management device 206/ 500), and then switch back on the CLI configuration window echo. As such, commands and response may be sent between the support device 202 to the networking devices 210a and 210b during configuration sessions without those commands and responses showing up in associated configuration windows that are displayed to the user.

The configuration engine 402 of the management engine 304/400 in the primary management device 300 also operates during the method 800 to detect the selection and de-selection of text in configuration windows provided for a configuration session with the networking devices 210a and 210b. For example, if the configuration engine 402 in the primary management device 300 detects that the user has selected or de-selected text in a CLI configuration window provided for a configuration session, a notification of the selected or de-selected text is sent via the messaging session to the automated support application (e.g., via the bridging engine 406 in the primary management device 204/300 and the in-band communication bridging engine 604 in the secondary management device 206/500). The configuration engine 402 of the management engine 304/400 in the primary management device 300 also operates during the method 800 to detect focus and de-focus of configuration windows. For example, if the configuration engine 402 in the primary management device 300 detects that the user has selected a CLI configuration window (e.g., in order to input a CLI command), a notification of the selection (as well as any de-selection of any other CLI configuration window) may be sent via the messaging session to the automated support application (e.g., via the bridging engine 406 in the primary management device 204/300 and the in-band communication bridging engine 604 in the secondary management device 206/500). The configuration engine 402 in the management engine 304/400 of the primary management device 300 also operates during the method 800 to detect output from the network devices 210a and 210b. For example, if the configuration engine 402 in the primary management device 300 detects output from the network device 210a (e.g., a syslog), that output may be mirrored via the messaging session to the automated support application (e.g., via the bridging engine 406 in the primary management device 204/300 and the in-band communication bridging engine 604 in the secondary management device 206/ 500). As such, the configuration engine 402 of the management engine 304/400 in the primary management device 300 operates to share data generated during configuration sessions with the automated configuration support application in the support device 202 so that the automated configuration support application has "a view" of the user-side actions being conducted during those configuration sessions.

The automated configuration support application executed by the support engine 702 in the support device 202/700 operates during the method 800 to detect when a messaging session has been linked with configuration session(s). For example, if the automated configuration support application is notified (e.g., by the bridging engine 406 in the primary management device 300) that a messaging session has been linked with respective configuration sessions for each of the network devices 210a and 210b, for each configuration session the automated configuration support application may create a local database entry (e.g., in the support database 706), send an in-band "show tech" command to the corresponding network device via the messaging session (e.g., via the in-band communication bridging engine 604 in the secondary management device 206/500 and the bridging engine 406 in the primary management device 204/300), receive associated in-band responses and update the local database entry, identify the network device neighbors based on Link Layer Discovery Protocol (LLDP) information and create internal database links to those neighbor entries (e.g., in the support database 706), and analyze the configuration and status of the network device (e.g., using the network device's operating system applications.) In some examples, the analysis of the configuration and status of the network device may include determining if a newer version of its operating system is available, determining if any new application notes/fields notices are available and relevant to the network device's configuration, and performing an audit of the network device configuration (e.g., which may be determined based on the list of features configured on that network device). Following the analysis of the configuration and status of the network device, the automated configuration support application may determine changes to improve the performance and/or stability of the network device, and provide those changes in an automated configuration support application message that is sent via the messaging session for display to the user.

The automated configuration support application executed by the support engine 702 in the support device 202/700 also operates during the method 800 to receive in-band notifications generated in the configuration sessions. For example, if the automated configuration support application receives a notification from the bridging engine 406 in the primary management device 204 that was generated in the configuration sessions (e.g., an indication of an active/selected CLI configuration window, an indication of selected text in a CLI configuration window, etc.), the automated configuration support application may note the current active CLI configuration window (if applicable) and update the local database entry in the support database 705 for the configuration session with the selected text (if applicable).

The automated configuration support application executed by the support engine 702 in the support device 202/700 also operates during the method 800 to receive in-band notifications of systems events occurring in the network devices. For example, if the automated configuration support application receives a notification from the bridging engine 406 in the primary management device 204 of a system event occurring in the network device 210a, the automated configuration support application may then interpret that system event and, if an error is detected, determine a possible cause and/or debug commands. Following the determination of a possible cause and/or debug commands, the automated configuration support application may provide those possible causes and/or debug commands in an automated configuration support application message that is sent via the messaging session for display to the user.

The automated configuration support application executed by the support engine 702 in the support device 202/700 also operates during the method 800 to receive user commands provided in the CLI configuration windows, as well as associated network device responses. For example, if the automated configuration support application receives user commands and associated network device responses mirrored by the bridging engine 406 in the primary management device 204 during a CLI configuration session, the automated configuration support application may then identify features on the network device that are being configured. In addition, the automated configuration support application may then determine a next set of features that may be configured (in the network device being configured, or in another network device that is connected to that network device), determine associated commands for configuring that next set of features, and provide those associated commands in an automated configuration support application message that is sent via the messaging session for display as a message to the user. Furthermore, the automated configuration support application may then determine possible new sub-features that are associated with the features being configured and that would be available if then network device operating system were upgraded, and provide a description of those new sub-features along with a suggestion to upgrade the network device operating system in an automated configuration support application message that is sent via the messaging session for display as a message to the user. Further still, the automated configuration support application may also determine errors and/or warnings associated with misconfigurations of the network device, and provide a warning message and/or possible corrections to those misconfigurations in an automated configuration support application message that is sent via the messaging session for display to the user.

The automated configuration support application executed by the support engine 702 in the support device 202/700 also operates during the method 800 to receive user messages from the user via the messaging session. For example, if the automated configuration support application receives a user message via the messaging session, the automated configuration support application may then identify a currently active/selected CLI configuration window, determine a configuration object in the CLI configuration window that was last configured/monitored/selected, identify a parameter of the identified configuration object, use the identified and currently active CLI configuration window, the configuration object, and the parameter, along the user message, to isolate the context of the user message. In addition, the automated configuration support application may then use the isolated context of the user message to determine commands to execute on the network device, provide those commands via the messaging session to the configuration engine 402 (e.g., via the in-band communication bridging engine 604 in the secondary management device 206/500 and the bridging engine 406 in the primary management device 204/300) for execution on the network device, receive a network device response via the messaging session, and provide that response in an automated configuration support application messages that is sent via the messaging session for display to the user. As such, the support engine 702 in the support device 202/700 may provide an automated configuration support application that receives data shared the bridging engine 406 in the primary management device 204/300 that gives it a view of the user side of the configuration session, while also executing commands on the network device(s) under configuration to obtain further information about that configuration session, and uses that configuration session knowledge to send messages to the user via the support messaging session that provide contextual configuration support to the user.

The bridging engine 406 of the management engine 304/400 in the primary management device 204/300 operates during the method 800 to detect when a support messaging session has been created for configuration session(s) with network device(s). For example, if the bridging engine 406 in the primary support device 204/300 detects a support messaging session has been created for configuration session(s) with network device(s), the bridging engine 406 links the messaging session with the configuration session(s), and provides an in-band notification about the linked configuration session(s) via the messaging session to the automated configuration support application in the support device 202/700 (e.g., via the bridging engine 406 in the primary management device 204/300 and the in-band communication bridging engine 604 in the secondary management device.)

The bridging engine 406 in the management engine 304/400 of the primary management device 204/300 also operates during the method 800 to detect when a user has selected automated configuration support application command(s) from a messaging session message for injection into the CLI configuration window. As discussed above, the automated configuration support application may generate commands for execution on the network devices 210a or 210b, and provide them in a message sent via the messaging session. In some embodiments, those commands may be provided with the ability to automatically inject the command set into a particular network device 210a or 210b. If the bridging engine 406 in the primary support device 204/300 detects a user has selected to automatically inject automated configuration support application command(s) that were sent by the automated configuration support application in a message displayed in the messaging session, the bridging engine 406 provides the automated configuration support application command(s) to the configuration engine 402 for automatic provision to the network device.

The bridging engine 406 of the management engine 304/400 in the primary management device 204/300 also operates during the method 800 to detect when a user has selected automated configuration support application options provided by the automated configuration support application in the messaging session. For example, if the bridging engine 406 in the primary support device 204/300 detects a user has selected automated configuration support application options provided in a message by the automated configuration support application during the messaging session, the bridging engine 406 may provide an in-band notification of the automated configuration support application option selection via the messaging session to the automated configuration support application (e.g., via the bridging engine 406 in the primary management device 204/300 and the in-band communication bridging engine 604 in the secondary management device.)

The bridging engine 406 of the management engine 304/400 in the primary management device 204/300 also operates during the method 800 to detect when a user has selected a link provided by the automated configuration support application in the messaging session. For example, if the bridging engine 406 in the primary support device 204/300 detects a user has selected a link provided in a message by the automated configuration support application during the messaging session, the bridging engine 406 may launch a browser on primary management device 204 that is directed to the link such that the link is displayed on the display subsystem 308.

The bridging engine 406 of the management engine 304/400 in the primary management device 204/300 also operates during the method 800 to detect when a user has ended a configuration session. For example, if the bridging engine 406 in the primary support device 204/300 detects a user has ended a configuration session, the bridging engine 406 may end the configuration session, and provide an in-band notification of the ended configuration session via the messaging session to the automated support application (e.g., via the bridging engine 406 in the primary management device 204/300 and the in-band communication bridging engine 604 in the secondary management device.) As such, the bridging engine 406 in the primary management device 204/300 operates to share information across different components in the configuration support system 200 to allow those different components to interact as described herein.

The messaging engine 504 in the secondary management device 206/500 operates during the method 800 to detect when a user has paired the messaging session with the primary management device 204. For example, if the messaging engine 504 in the secondary management device 206/500 detects a user has paired a messaging session with the primary management device 204, the messaging engine 504 sends a notification of the pairing to the automated configuration support application via the messaging session (e.g., via the in-band communication bridging engine 604 in the secondary management device.)

The messaging engine 504 in the secondary management device 206/500 also operates during the method 800 to detect when a message that is directed to the user has been received from the automated configuration support application. For example, if the messaging engine 504 in the secondary management device 206/500 detects a message that is directed to the user has been received from the automated configuration support application, the messaging engine 504 provides the message for display to the user in the messaging session, and mirrors the message for display on the primary management device 204.

The messaging engine 504 in the secondary management device 206/500 also operates during the method 800 to detect when an in-band message has been received. For example, if the messaging engine 504 in the secondary management device 206/500 detects an in-band message has been received, the messaging engine 504 bridges the message based on its in-band message destination.

The messaging engine 504 in the secondary management device 206/500 also operates during the method 800 to unpair with the primary management device 204. For example, if the messaging engine 504 in the secondary management device 206/500 receives an instruction to unpair with the primary management device 204, the messaging engine 504 sends a notification of the unpairing via the messaging session to the automated configuration support application (e.g., via the in-band communication bridging engine 604 in the secondary management device.) Thus, the messaging engine 504 in the secondary management device 206/500 operates to provide the support messaging session with the support device 202, and help to share data between the primary management device 204 and the support device 202.

As such, the different engines provided in the support device 202, the primary management device 204, and the secondary management device 206 may includes a variety of functionality that operates to allow for the sharing of data, the execution of commands, and the exchange of messages conducted during the method 800. Furthermore, that data sharing, command execution, and message exchange enables a variety of specific features that are particular helpful during the configuration of network devices. Referring now to FIGS. 9-24, specific examples of the functionality provided during the method 800 by the management device(s) and the support device is illustrated. One of skill in the art in possession of the present disclosure will appreciate that the sharing of data, the exchanging of messages, and the execution of commands illustrated and discussed below provide for configuration support via an automated configuration support application that vastly improves on conventional automated configuration support systems in which the automated configuration support application does not have any context as to what the user is seeing or doing on their end of the configuration and messaging session. However, while the specific embodiments illustrated and described below provide several particular benefits, one of skill in the art in possession of the present disclosure will recognize a variety of other benefits that may be realized when incorporating the teachings of the present disclosure into an automated configuration support system.

Figure 9:
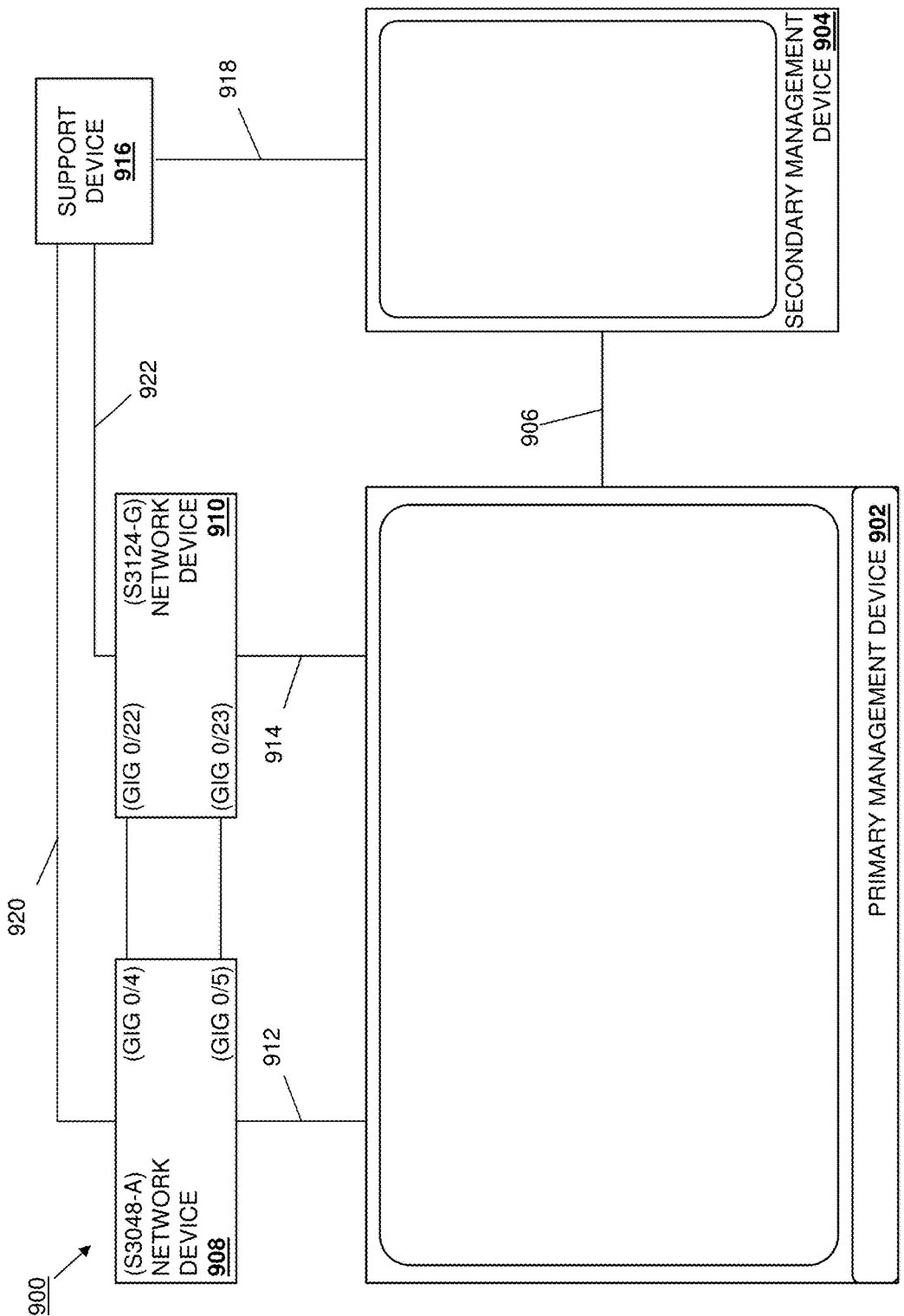
FIG. 9 is a schematic view illustrating an embodiment of the configuration support system of FIG. 2.

Referring now to FIG. 9, an embodiment of the configuration support system 900 used in the examples below is illustrated. The configuration support system 900 includes a primary management device 902 that is illustrated as a laptop/notebook computer, and a secondary management device 904 that is illustrated as a mobile phone that may be wirelessly connected to the primary management device 902 by a BLUETOOTH® link 906. A first network device 908 being configured is illustrated as a first switch named "S3048-A", a second network device 910 being configured is illustrated as a second switch named "S3124-G", with the first network device 908 connected via its port "GIG 0/4" to a port "GIG 0/22" on the second network device 910, and the first network device 908 connected via its port "GIG 0/5" to a port "GIG 0/23" on the second network device 910. A support device 916 is provided as an instant messaging server, and is connected to the secondary management device 904 via a cellular or Wifi network link 918, while being connected to the first network device 908 via an out-of-band communication link 920 and the second network device 910 via an out-of-band communication link 922. However, as discussed above, the out-of-band communications links 920 and 922 are not necessary to the functionality below and may be omitted in other embodiments.

Figure 10:
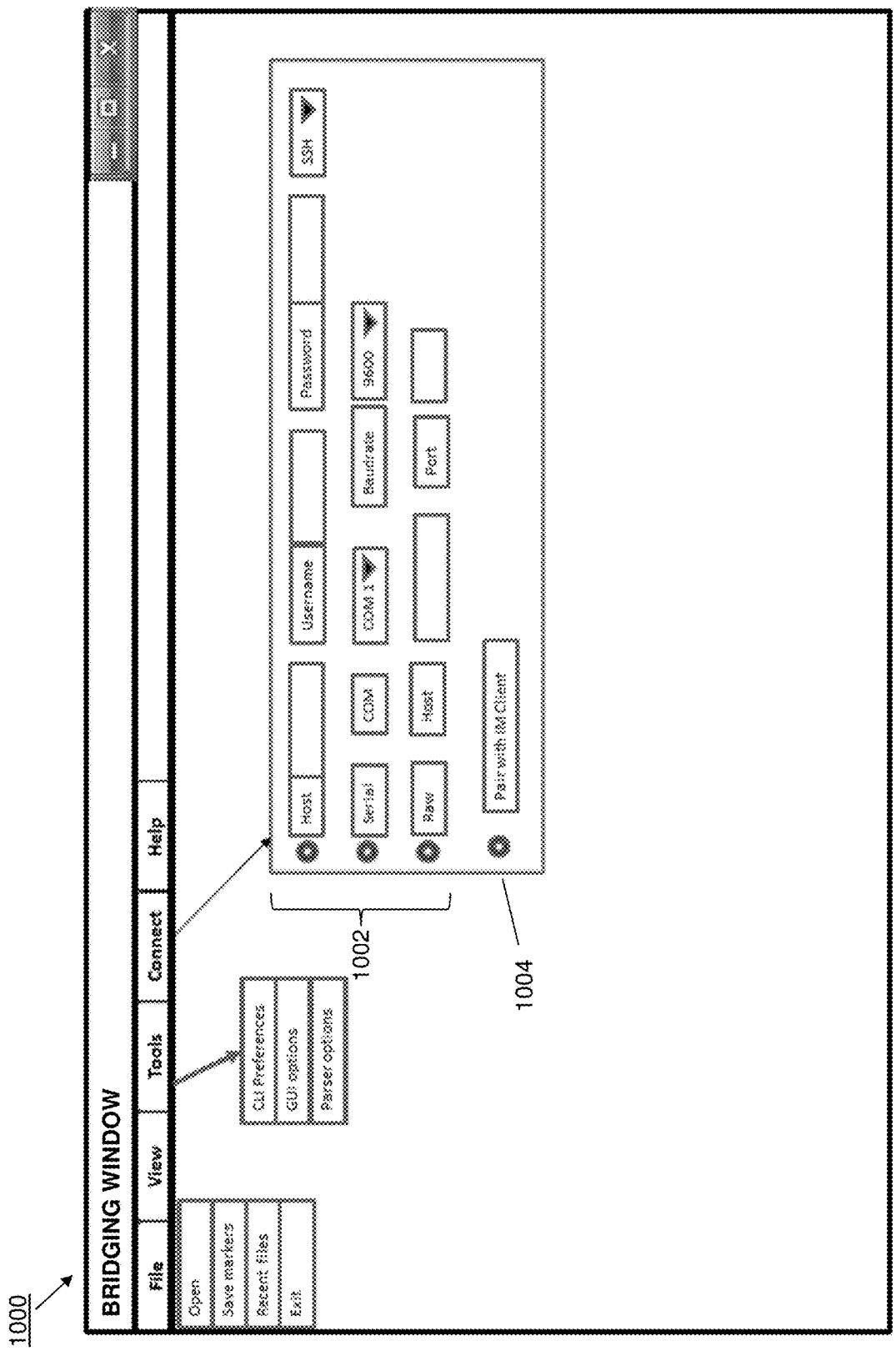
FIG. 10 is a screen shot illustrating an embodiment of bridging window displayed on the primary management device in the configuration support system of FIG. 9.

Referring now to FIG. 10, an embodiment of a bridging window 1000 is illustrated that may be provided for display on the primary management device 902, and that may be used to allow a user to create configuration sessions for the network devices 908 and 910, create a messaging session with the support device 916, and link the configuration sessions with the messaging session. For example, the bridging window 1000 includes a configuration session detail provisioning section 1002 that may be utilized to provide the details necessary to create a configuration session with a network device, and a messaging session linking section 1004 that may be utilized to link a support messaging session (e.g., with the support device 916) to the configuration session that is created. One of skill in the art in possession of the present disclosure will understand how the bridging window 1000 (or graphical user interfaces like it) may be utilized by a user of the primary management device 902 to create and link the configuration sessions and messaging session discussed below.

Figure 11:
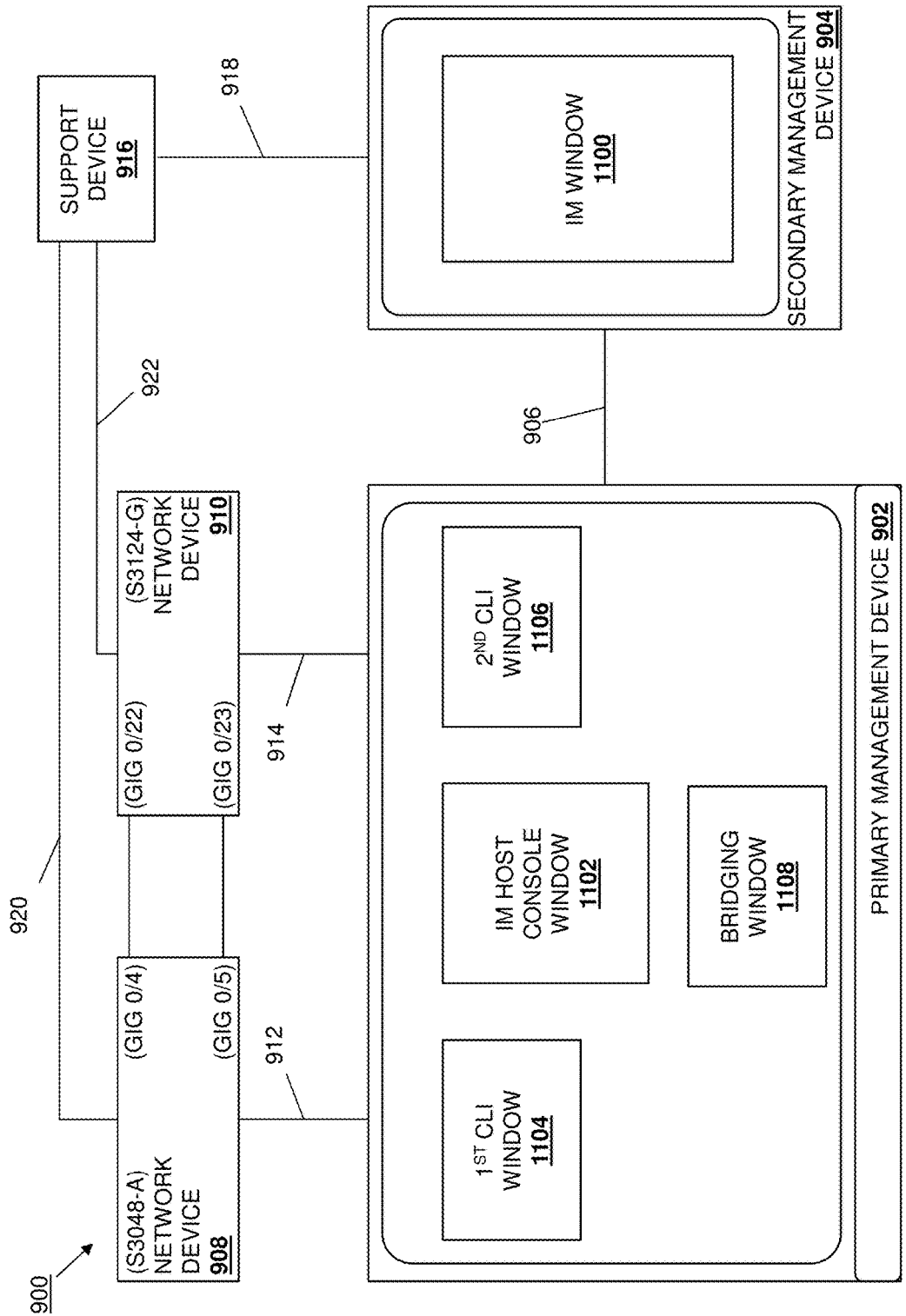
FIG. 11 is a schematic view illustrating an embodiment of the configuration support system of FIG. 2 during the method of FIG. 8.

For example, with reference to FIG. 11, the configuration support system 900 is illustrated subsequent to the user of the primary management device 902 and secondary management device 904 creating configuration sessions for the network devices 908 and 910, and linking a messaging session with the support device 916 to those configuration sessions. As such, the secondary management device 904 is displaying an instant messaging window 1100 that is provided as part of the messaging session with the support device 916, and the primary management device 902 is displaying an IM host console window 1102 that is provided by the interactions of the primary management device 902 and the secondary management device 904 as discussed above, and that mirrors the messaging session display via the instant messaging window 1100 on the secondary management device 904. Furthermore, the primary management device 902 is also displaying a first CLI window 1104 that is part of a configuration session with the network device 908, and a second CLI window 1106 that is part of a configuration session with the network device 910. Finally, the primary management device 902 is displaying a bridging window 1108 that may be the bridging window 1000 discussed above, but subsequent to the linking of the configuration sessions and the messaging session such that the bridging window 1108 displays information about the linking of those configuration sessions and messaging session. Thus, in this specific example, the user has created configuration sessions with each of the network devices 908 and 910 to provide the first and second CLI windows 1104 and 1106, and has begun a instant messaging session with the support device 916 to provide the instant messaging window 1100 and the instant messaging host console window 1102, while the bridging window 1108 is operating to link the configuration sessions and the messaging session to provide functionality illustrated and described below.

Figure 12:
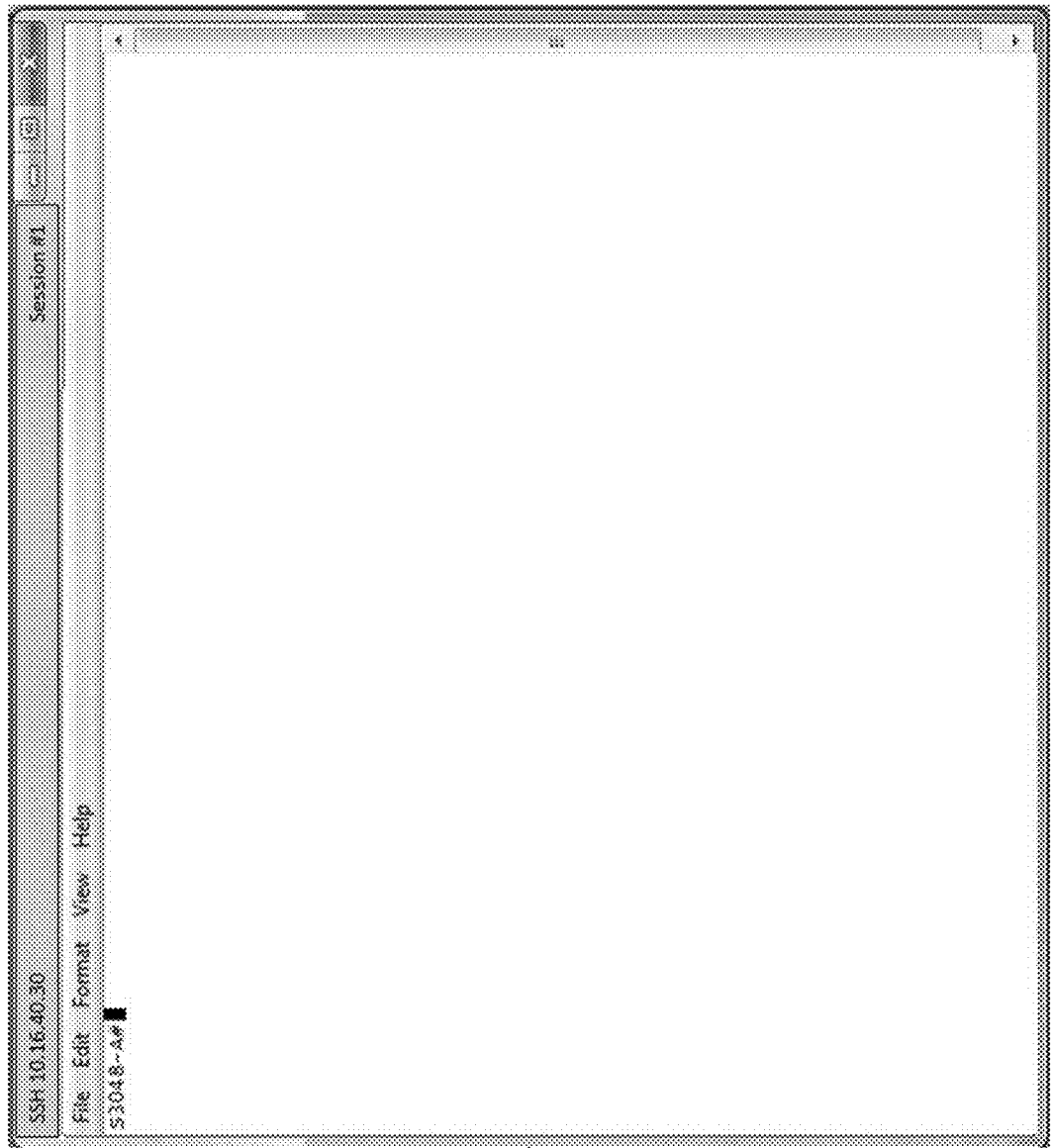
FIG. 12 is a screen shot illustrating an embodiment of a first Command Line Interface (CLI) window displayed on the primary management device in the configuration support system of FIG. 9 during the method of FIG. 8.

Referring now to FIG. 12, the first CLI window 1104 is illustrated following the user creating the configuration session with the network device 908, and displays the name "S3048-A" of the network device 908 to indicate that the configuration session has started with the network device 908. One of skill in the art in possession of the present disclosure will recognize that the configuration session resembles a normal CLI configuration session from a user perspective, with the first CLI window 1104 indicating a secure connection to the IP address of the network device (e.g., "SSH 10.16.40.30") and tagged as "Session #1". When the configuration session with the network device 908 is created, the bridging engine in the primary management device 902 may inform the automated configuration support application in the support device 916 (i.e., via the messaging session on the secondary management device 904, as discussed above) that the new session #1 with the network device 908 (e.g., switch "S3048-A" with IP address "10.16.40.30") has been created. In response, the automated configuration support application in the support device 916 may create a new database entry for that configuration session, and send a "show tech" command to the bridging engine in the primary management device 908 (i.e., via the messaging session on the secondary management device 904, as discussed above). The bridging engine in the primary management device 908 will then determine that the "show tech" command is associated with the configuration session (e.g., "session #1") and directed to the network device 908, and inject the "show tech" command into the configuration session application socket to provide it as part of the configuration session, which will cause that "show tech" command to be executed on the network device 908. Furthermore, the bridging engine in the primary management device 908 will also receive any response to that "show tech" command from the network device 908. However, because the "show tech" command is issued by the automated support application and directed to the network device 908, the bridging engine in the primary management device 902 will prevent the CLI input-output associated with the "show tech" command and response from being displayed in the first CLI window 1104 (e.g., because that first CLI window will only display CLI input/outputs associated with commands issued by the user and the corresponding responses of the network device 908 in order to prevent the first CLI window 1104 from becoming cluttered with support device 916/network device 908 communications).

Thus, the bridging engine in the primary management device 902 may provide the response from the network device 908 to the "show tech" command to the automated configuration support application in the support device 916 (i.e., via the messaging session on the secondary management device 904, as discussed above). It should be noted that these commands and responses are also not displayed in the instant messaging window 1100 or the instant messaging host console window 1102, as they are not messages from the user that are directed to the automated configuration support application, or from the automated configuration support application that are directed to the user. The automated configuration support application in the support device 916 may then parse and analyze the response by the network device 908 to the "show tech" command. For example, from the response provided by the network device 908, the automated configuration support application may determine that the network device 908 is running an older operating system version (e.g., "OS9.9.P2 version", discussed below), that the network device 908 has features configured that include Open Shortest Path First (OSPF), Virtual Trunk Linking (VLT), and Control Plane Policing (CoPP.) Furthermore, the automated configuration support application may determine that a later version of the operating system (e.g., "OS9.10.P5", discussed below) has feature upgrades to the specific features (e.g., OSPF, VLT, CoPP) that are configured on the network device 908, and may create an automated configuration support application message 1300 and send that message 1300 to the user via the messaging session.

Figure 13:
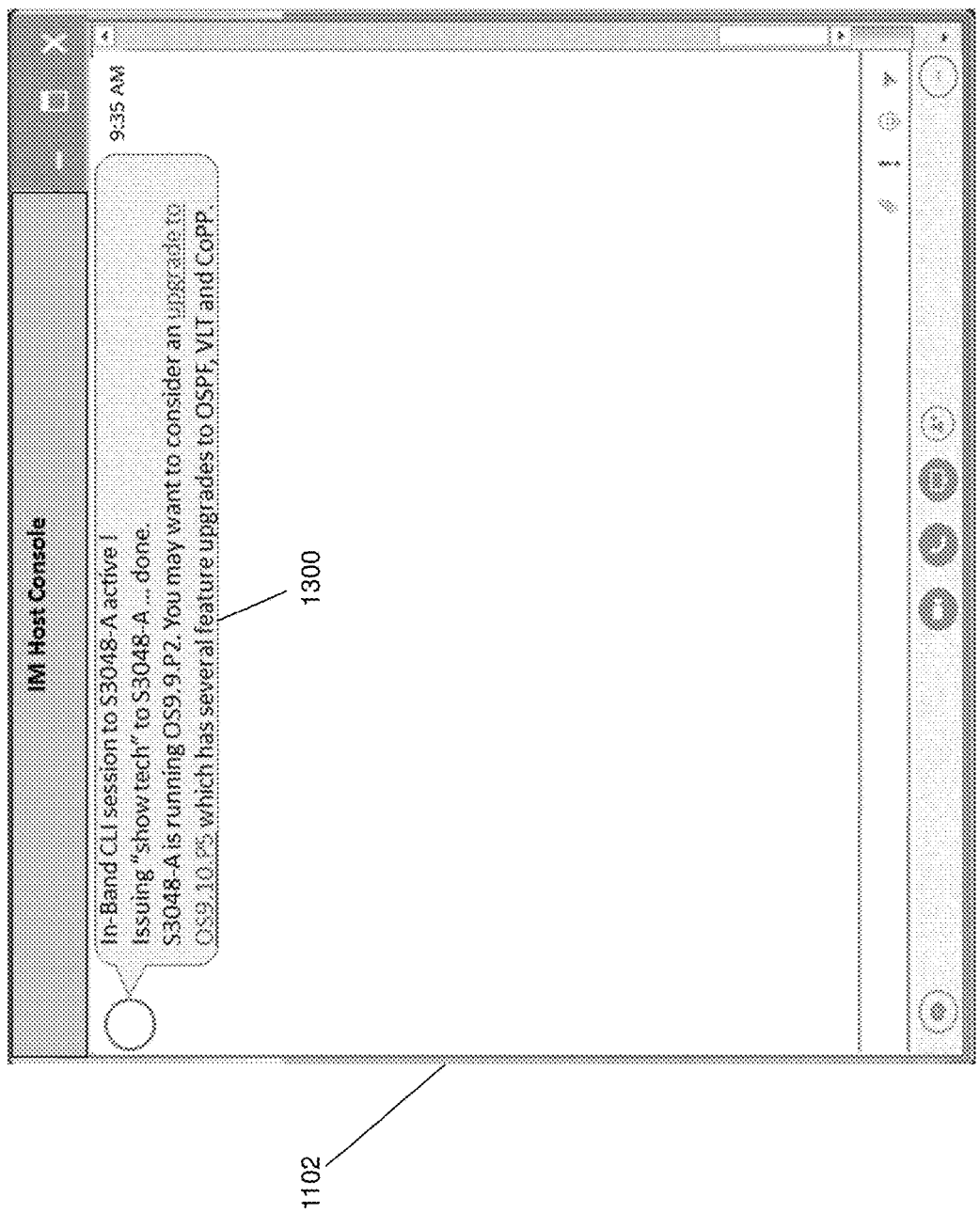
FIG. 13 is a screen shot illustrating an embodiment of an IM host console window displayed on the primary management device in the configuration support system of FIG. 9 during the method of FIG. 8.

Referring now to FIG. 13, the instant messaging host console window 1102 is illustrated that includes the automated configuration support application message 1300 sent to the user via the messaging session, and one of skill in the art in possession of the present disclosure will recognize that the instant messaging window 1100 on the secondary management device 904 may display the same message 1300. As can be seen, the automated support application message 1300 indicates to the user that an in-band CLI configuration session with the network device 908 (i.e., "S3048-A") has been created, that a "show tech" command has been issued to the network device 908, that it has been determined that the network device 908 (i.e., "S3048-A") is running a particular operating system (i.e., "OS9.9.P2"), and that the user may want to update that operating system (i.e., to "OS9.10.P5") that has feature upgrades for OSPF, VLT, and CoPP features that are configured on the network device 908. Furthermore, as can be seen, a link to the updated operating system (i.e., to "OS9.10.P5") was provided in the automated configuration support application message 1300 by the automated configuration support application, and is displayed as part of the automated configuration support application message 1300, and the user may launch the link either from the instant messaging window 1100 on the secondary management device 904, or from the instant messaging host console window 1102, to access the updated operating system and, in some cases, proceed with upgrading the operating system of the network device 908.

Figure 14:
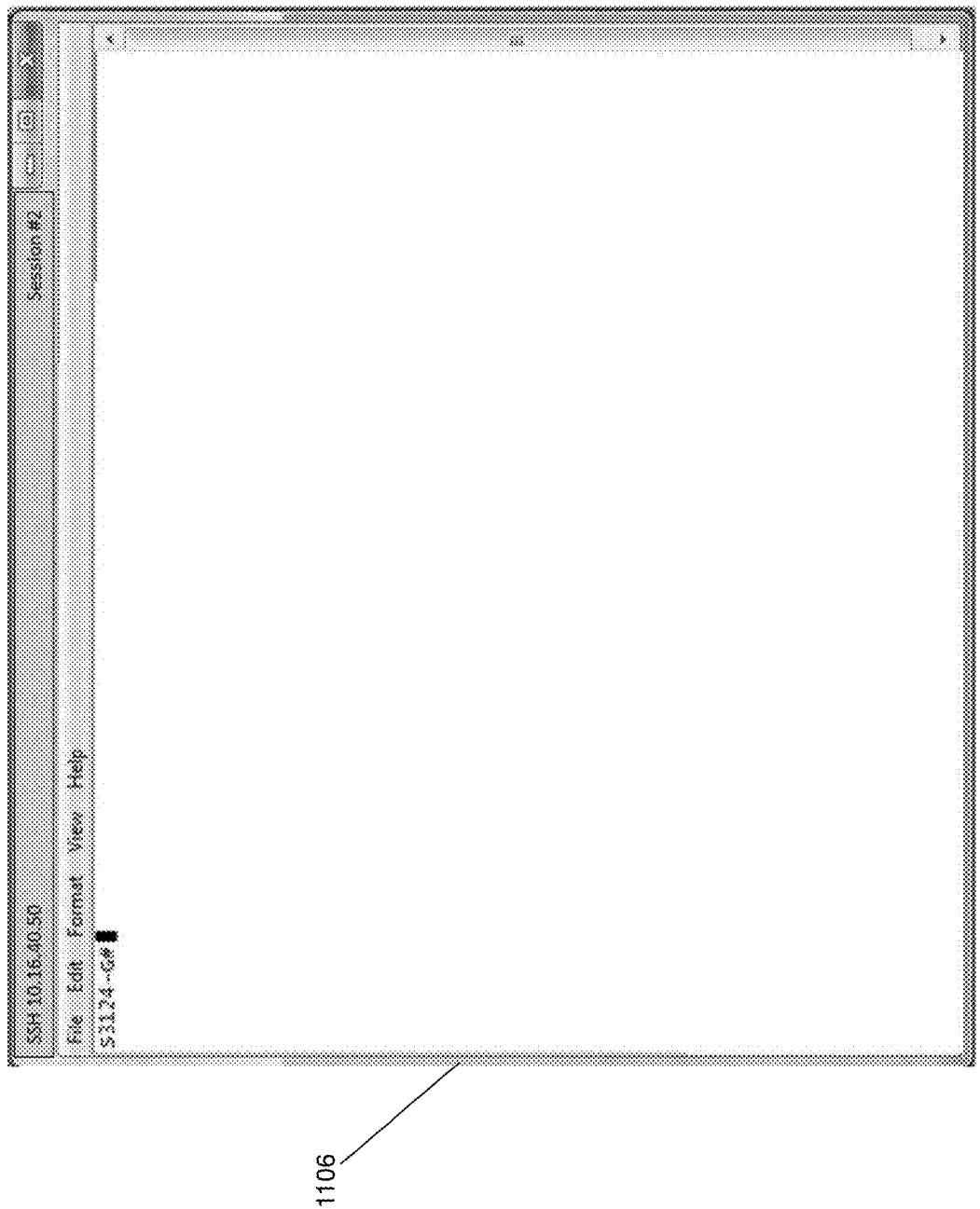
FIG. 14 is a screen shot illustrating an embodiment of a second CLI window displayed on the primary management device in the configuration support system of FIG. 9 during the method of FIG. 8.

Referring now to FIG. 14, the second CLI window 1106 is illustrated following the user creating the configuration session with the network device 910, and displays the name "S3124-G" of the network device 910 to indicate that the configuration session has started with the network device 910. One of skill in the art in possession of the present disclosure will recognize that the configuration session resembles a normal CLI configurations session from a user perspective, with the second CLI window 1106 indicating a secure connection to the IP address of the network device (e.g., "SSH 10.16.40.50") and tagged as "Session #2". When the configuration session with the network device 910 is created, the bridging engine in the primary management device 902 may inform the automated configuration support application in the support device 916 (i.e., via the messaging session on the secondary management device 904, as discussed above) that the new session #2 with the network device 910 (e.g., switch "S3124-G" with IP address "10.16.40.50") has been created. In response, the automated configuration support application in the support device 916 may create a new database entry for that configuration session, and send a "show tech" command to the bridging engine in the primary management device 908 (i.e., via the messaging session on the secondary management device 904, as discussed above). The bridging engine in the primary management device 908 will then determine that the "show tech" command is associated with the configuration session (e.g., "session #2") and directed to the network device 910, and inject the "show tech" command into the configuration session application socket to provide it as part of the configuration session, which will cause that "show tech" command to be executed on the network device 910. Furthermore, the bridging engine in the primary management device 908 will also receive any response to that "show tech" command from the network device 910. However, because the "show tech" command is issued by the automated configuration support application and directed to the network device 910, the bridging engine in the primary management device 902 will prevent the CLI input-output associated with the "show tech" command and response from being displayed in the second CLI window 1106 (e.g., because that second CLI window will only display CLI input/outputs associated with commands issued by the user and the corresponding responses of the network device 910 in order to prevent the second CLI window 1106 from becoming cluttered with support device 916/network device 910 communications).

Thus, the bridging engine in the primary management device 902 may provide the response from the network device 910 to the "show tech" command to the automated configuration support application in the support device 916 (i.e., via the messaging session on the secondary management device 904, as discussed above). It should be noted that these commands and responses are also not displayed in the instant messaging window 1100 or the instant messaging host console window 1102, as they are not messages from the user to the automated configuration support application, or from the automated configuration support application that are directed to the user. The automated configuration support application in the support device 916 may then parse and analyze the response by the network device 910 to the "show tech" command. For example, the automated configuration support application may determine that the network device 910 is running an older operating system version (e.g., "OS9.9.P2", discussed below), that the network device 910 has features configured that include Power over Ethernet+ (PoE+). Furthermore, the automated configuration support application may determine that a later version of the operating system (e.g., "OS9.10.P7", discussed below) has feature upgrades (e.g., uPoE) to the specific features (e.g., PoE+) that are configured on the network device 910, and that the PoE+ configuration of the network device 910 is deficient, and may create an automated configuration support application message 1500 and send that message 1500 to the user via the messaging session.

Figure 15:
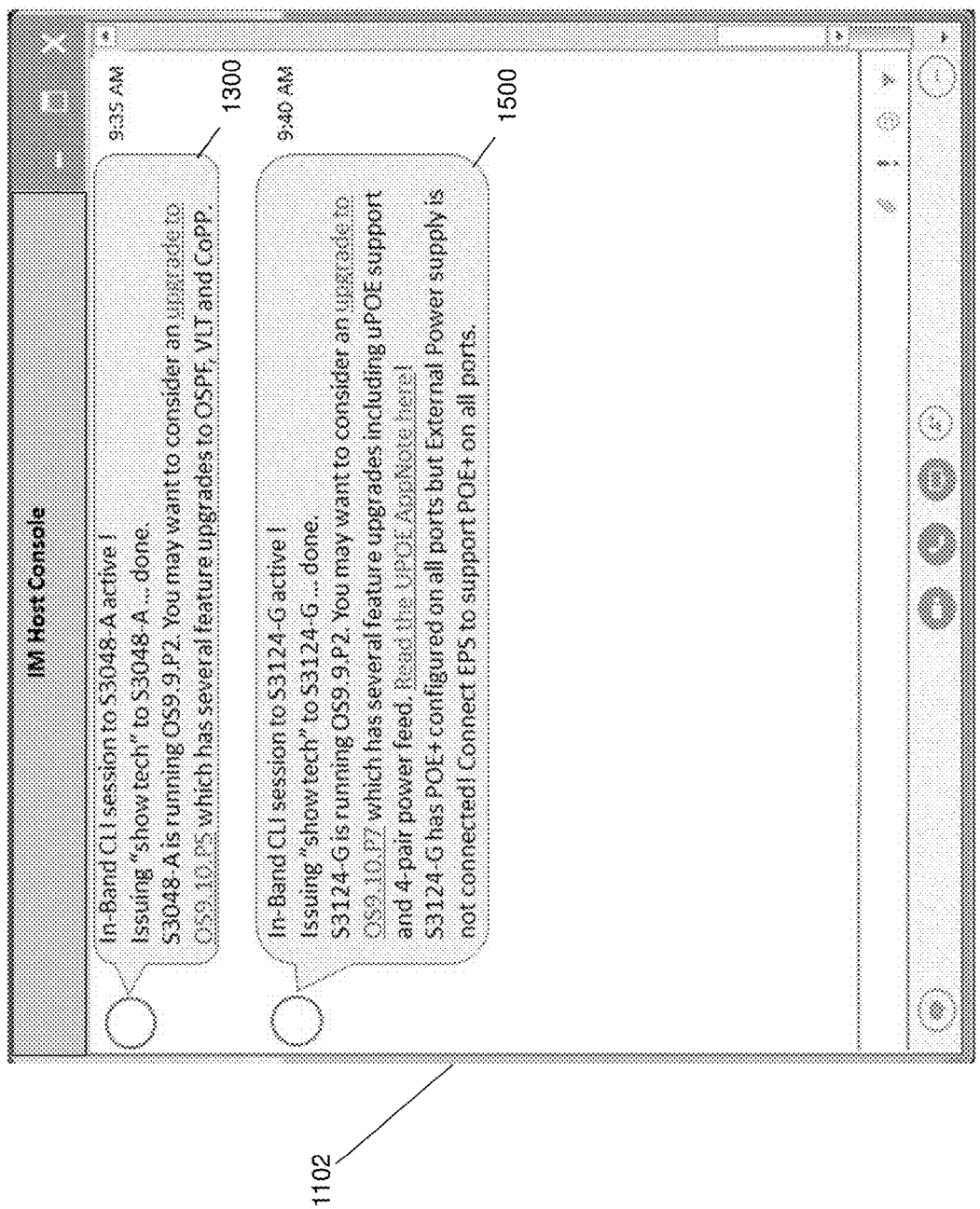
FIG. 15 is a screen shot illustrating an embodiment of an IM host console window displayed on the primary management device in the configuration support system of FIG. 9 during the method of FIG. 8.

Referring now to FIG. 15, the instant messaging host console window 1102 is illustrated that includes the automated configuration support application message 1500 sent to the user via the messaging session, and one of skill in the art in possession of the present disclosure will recognize that the instant messaging window 1100 on the secondary management device 904 may display the same message 1500. As can be seen, the automated configuration support application message 1500 indicates to the user that an in-band CLI configuration session with the network device 910 (i.e., "S3124-G") has been created, that a "show tech" command has been issued to the network device 910, that it has been determined that the network device 910 (i.e., "S3124-G") is running a particular operating system (i.e., "OS9.9.P2"), and that the user may want to update the operating system (i.e., to "OS9.10.P7") that has feature upgrades for PoE+ features that are configured on the network device 910. Furthermore, as can be seen, a link to the updated operating system (i.e., to "OS9.10.P7") was provided in the automated configuration support application message 1500 by the automated configuration support application, and is displayed as part of the automated configuration support application message 1500, and the user may launch the link either from the instant messaging window 1100 on the secondary management device 904, or from the instant messaging host console window 1102, to access the updated operating system and, in some cases, proceed with upgrading the operating system of the network device 910. Finally, the automated support application message 1500 indicates that the network device 910 has PoE+ configured on all ports, but that the external power supply is not connected, and recommends that the external power supply be connected to support PoE+ on all ports of the network device 910.

In addition to issuing the "show tech" commands discussed above, the automated configuration support application in the support device 916 may issue "show LLDP" commands to each of the network devices 908 and 910, and receive response (substantially as described above) that allow the automated configuration support application to determine that the ports "GIG 0/4" and "GIG 0/5" on the network device 908 are connected to ports "GIG 0/22" and "GIG 0/23" on the network device 910. In response, the automated configuration support application in the support device 916 may create a link between the configuration sessions for the network device 908 and the network device 910 (e.g., a link between the database entries for "session #1" and "session #2".)

Figure 16:
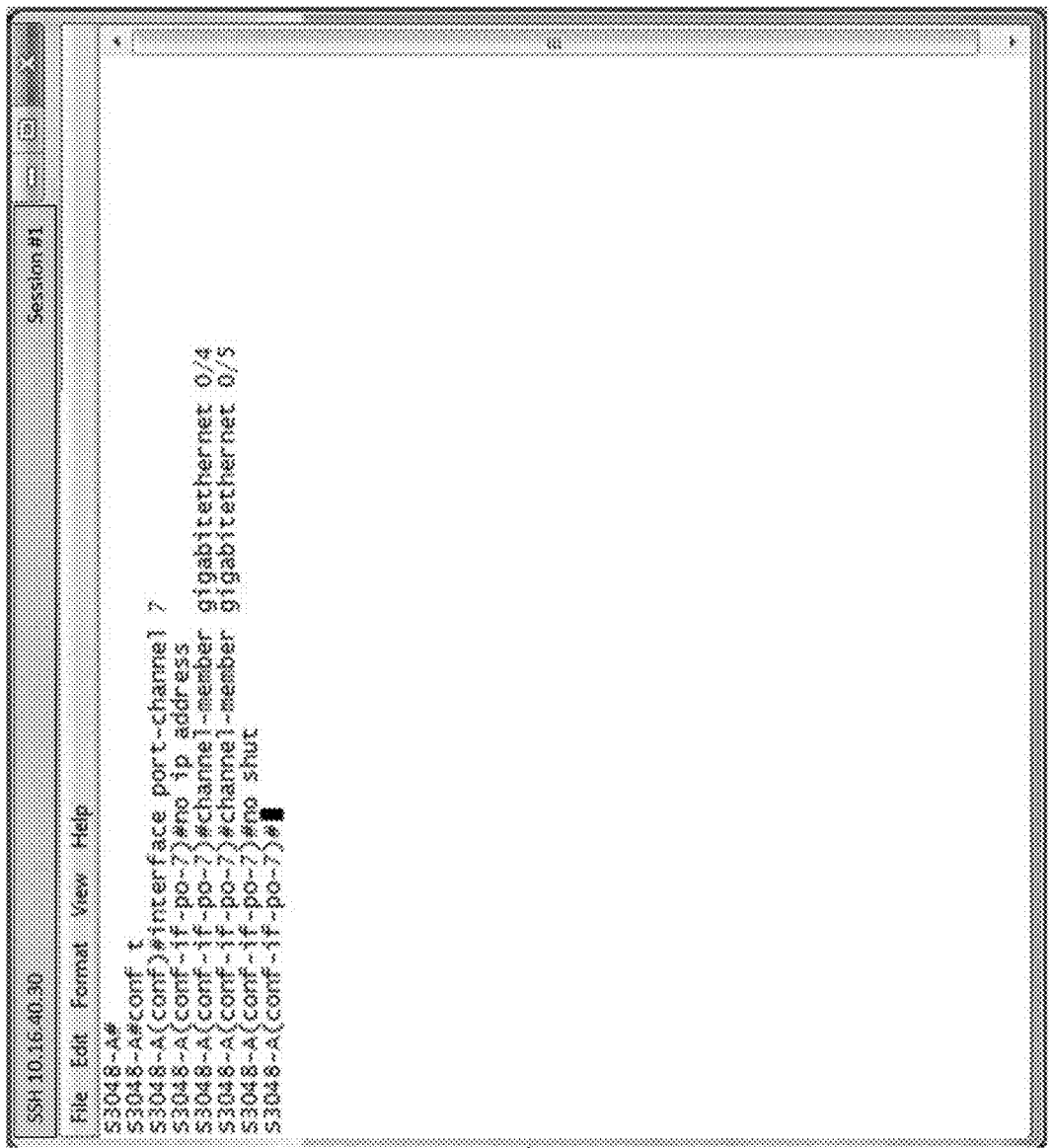
FIG. 16 is a screen shot illustrating an embodiment of a first CLI window displayed on the primary management device in the configuration support system of FIG. 9 during the method of FIG. 8.

Referring now to FIG. 16, the first CLI window 1104 is illustrated after the user of the primary management device 902 has provided commands for the configuration session with the network device 908. As can be seen in FIG. 16, the user has provided commands to configure a VLT portchannel on the network device 908 (e.g., "S3048-A"), just as may be done in a conventional CLI configuration session. However, as discussed above, the bridging engine in the primary management device 902 may operate to mirror each line of the CLI input and output to the automated configuration support application in the support device 916. Furthermore, upon the user entering the "no shut" command illustrated in FIG. 16, the automated configuration support application in the support device 916 may have that command mirrored to it (as discussed above) and may, in response, determine that the network device 910 (e.g., "S3124-G") needs a similar configuration because the two ports on the network device 908 that were configured as channel members (e.g., "GIG 0/4" and "GIG 0/5") are connected to ports on the network device 910 (e.g., "GIG 0/22" and GIG 0/23"). In response, the automated configuration support application in the support device 916 may create that configuration for the network device 910, and provide that configuration as an automated configuration support application message 1700 to the user via the messaging session.

Figure 17:
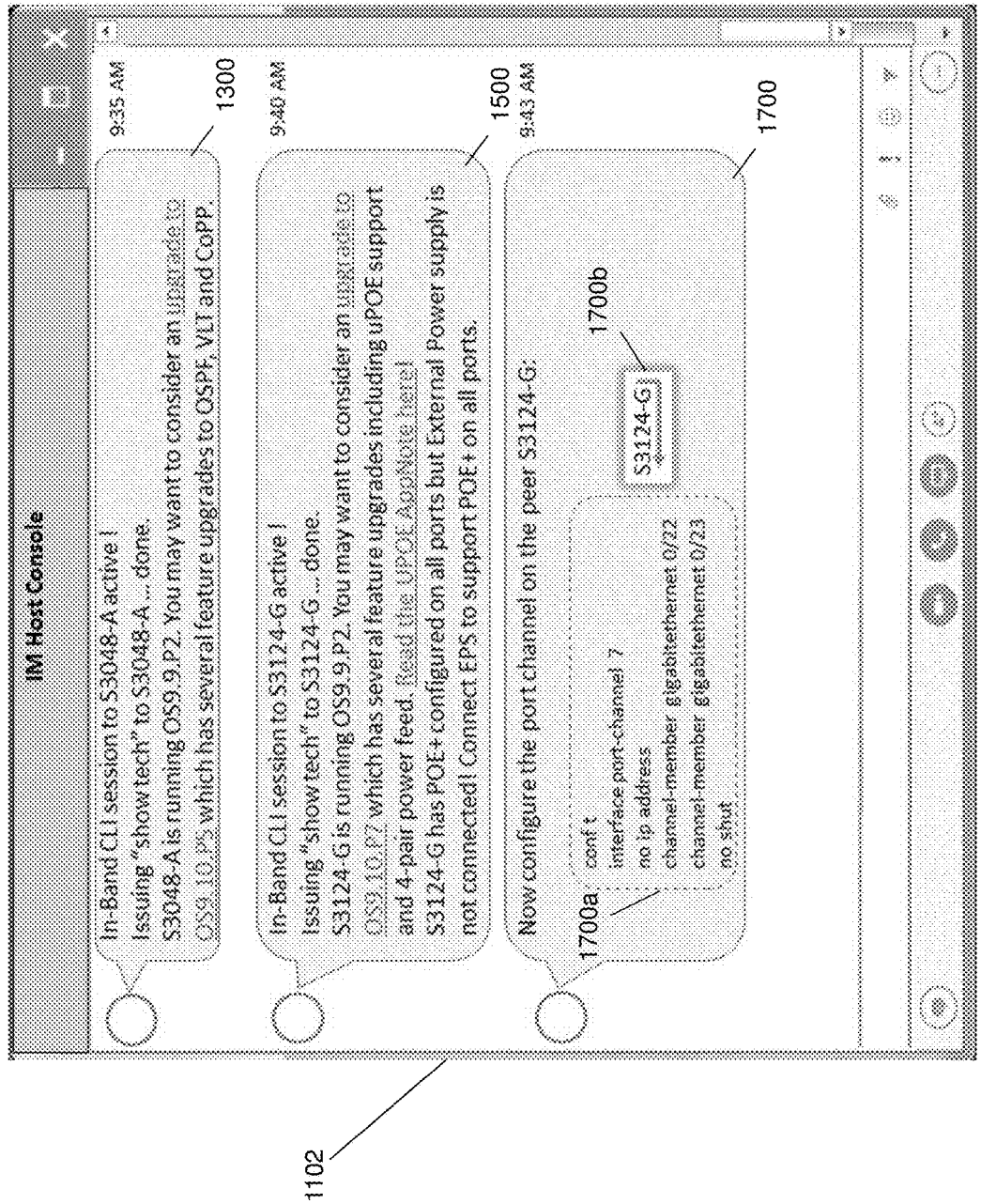
FIG. 17 is a screen shot illustrating an embodiment of an IM host console window displayed on the primary management device in the configuration support system of FIG. 9 during the method of FIG. 8.
Figure 18:
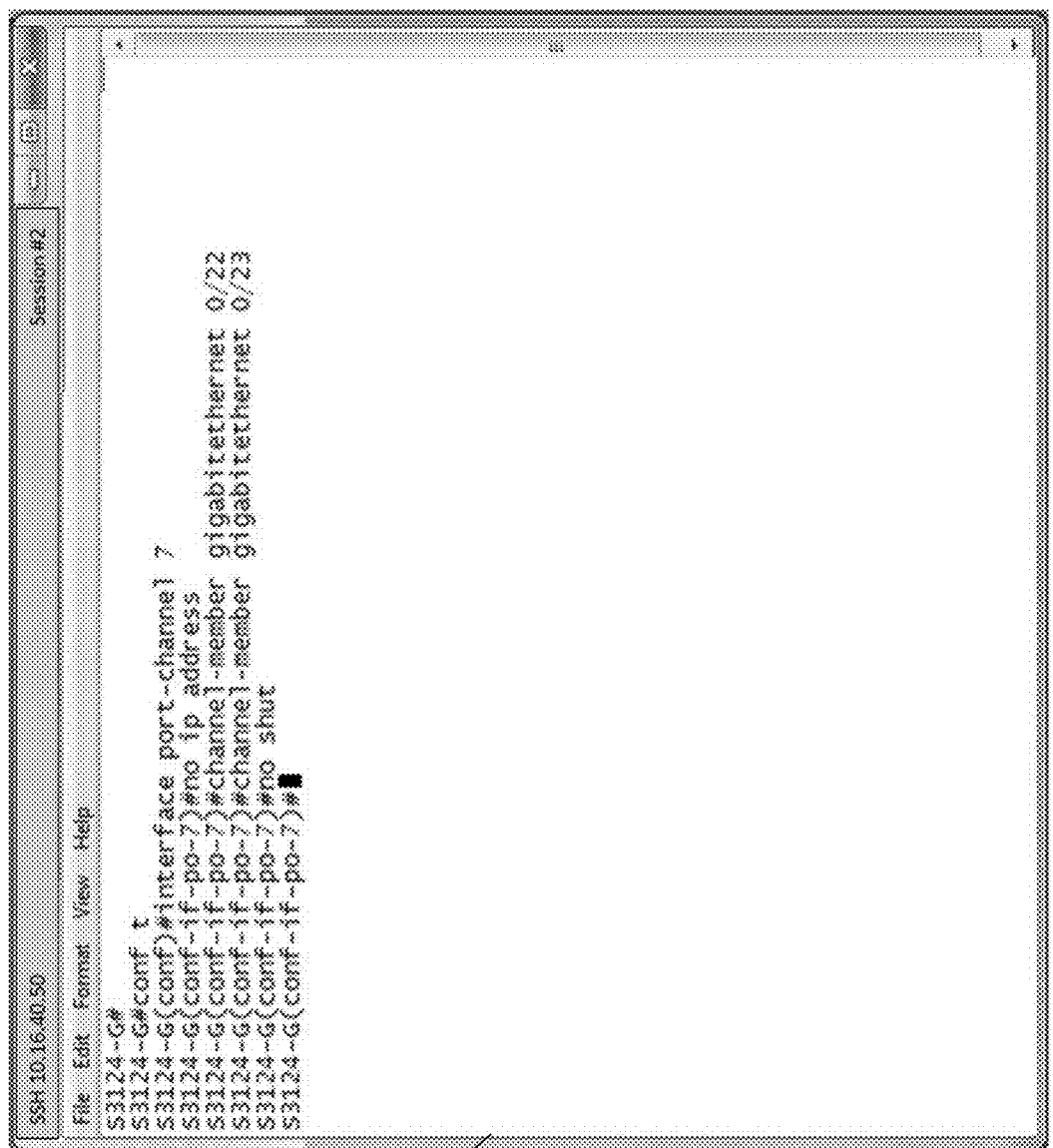
FIG. 18 is a screen shot illustrating an embodiment of a second CLI window displayed on the primary management device in the configuration support system of FIG. 9 during the method of FIG. 8.

Referring now to FIG. 17, the instant messaging host console window 1102 is illustrated that includes the automated configuration support application message 1700 sent to the user via the messaging session, and one of skill in the art in possession of the present disclosure will recognize that the instant messaging window 1100 on the secondary management device 904 may display the same message 1500. As can be seen, the automated configuration support application message 1700 indicates to the user that they should now configure the network device 910 (e.g., "S3124-G") given the configuration that was just provided in the configuration session with the network device 908. As can be seen, the automated configuration support application message 1700 includes a text configuration 1700a, along with a command execution element 1700b that indicates the network device 910 (e.g., "S3124-G") to indicate that the command execution element 1700b may be selected to automatically provide the configuration 1700a to the network device 910. In response to the user selecting the command execution element 1700b, the bridging engine in the primary management device 902 may send the configuration 1700a to the configuration engine in the primary management device 902 to provide that configuration 1700a as part of the configuration session to the network device 910. For example, FIG. 18 illustrates the second CLI window 1106 following the selection of the command execution element 1700b, and the configuration 1700a has been automatically provided as part of the configuration session with the network device 910, and thus is displayed in the second CLI window 1106.

Figure 19:
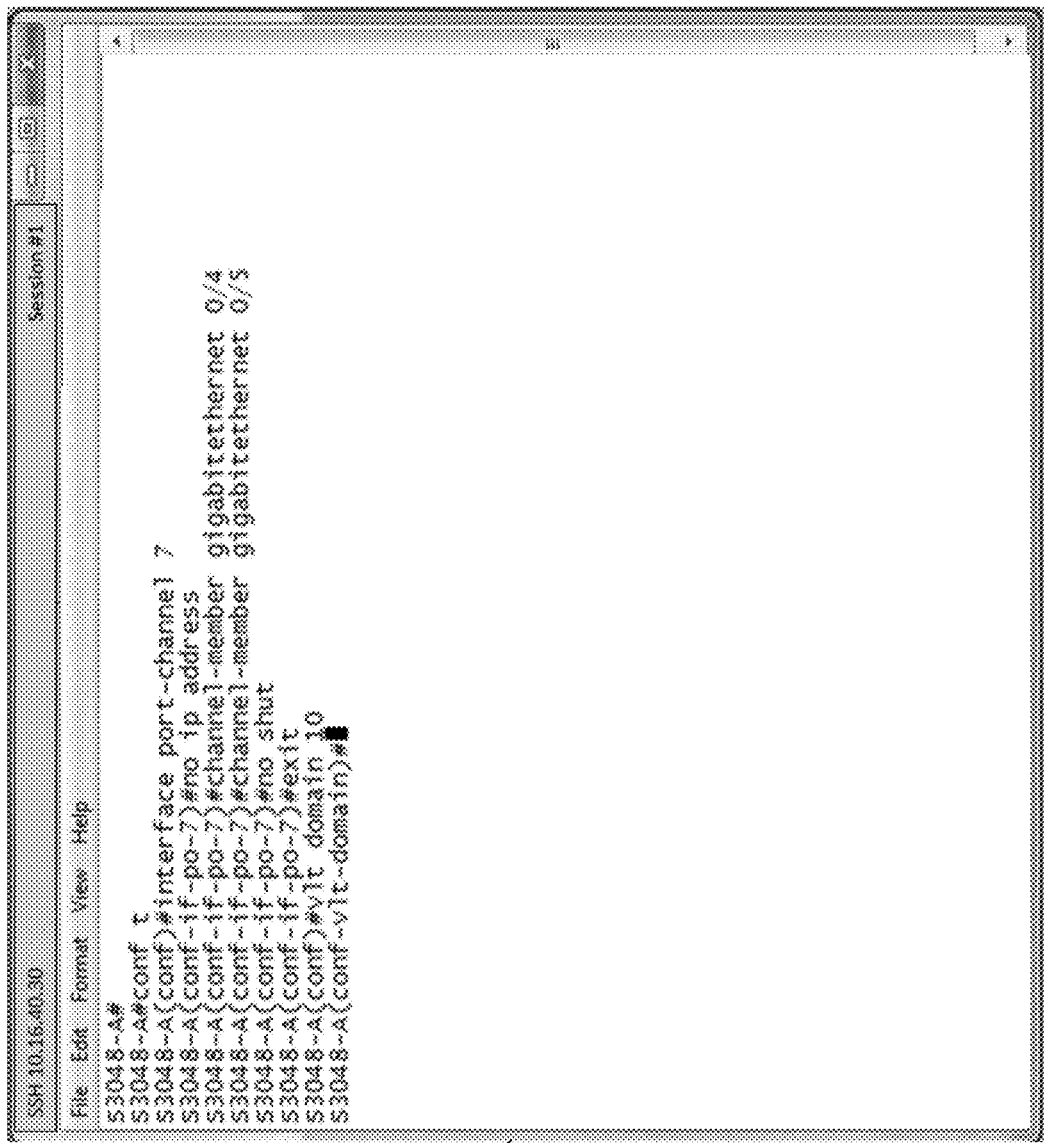
FIG. 19 is a screen shot illustrating an embodiment of a first CLI window displayed on the primary management device in the configuration support system of FIG. 9 during the method of FIG. 8.

Referring now to FIG. 19, the first CLI window 1104 is illustrated after the user of the primary management device 902 has provided commands for the configuration session with the network device 908. As can be seen in FIG. 19, the user has provided commands to configure a VLT domain on the network device 908 (e.g., "S3048-A"), just as may be done in a conventional CLI configuration session. However, as discussed above, the bridging engine in the primary management device 902 may operate to mirror each line of the CLI input and output to the automated configuration support application in the support device 916. Furthermore, upon the user entering the VLT domanidentifier (e.g., "10"), the automated configuration support application in the support device 916 may have that command mirrored to it (as discussed above) and may, in response, pro-actively present the next set of configurations (e.g., a backup-destination and peer-link) that the user may want to provide in the configuration session with the network device 908. It should be appreciated that such configuration suggestions by the automated configuration support application are enabled based on the knowledge that the network device 908 is connected to the network device 910 (as discussed above). In response, the automated configuration support application in the support device 916 may create that configuration for the network device 910, and provide that configuration as an automated configuration support application message 2000 to the user via the messaging session.

Figure 20:
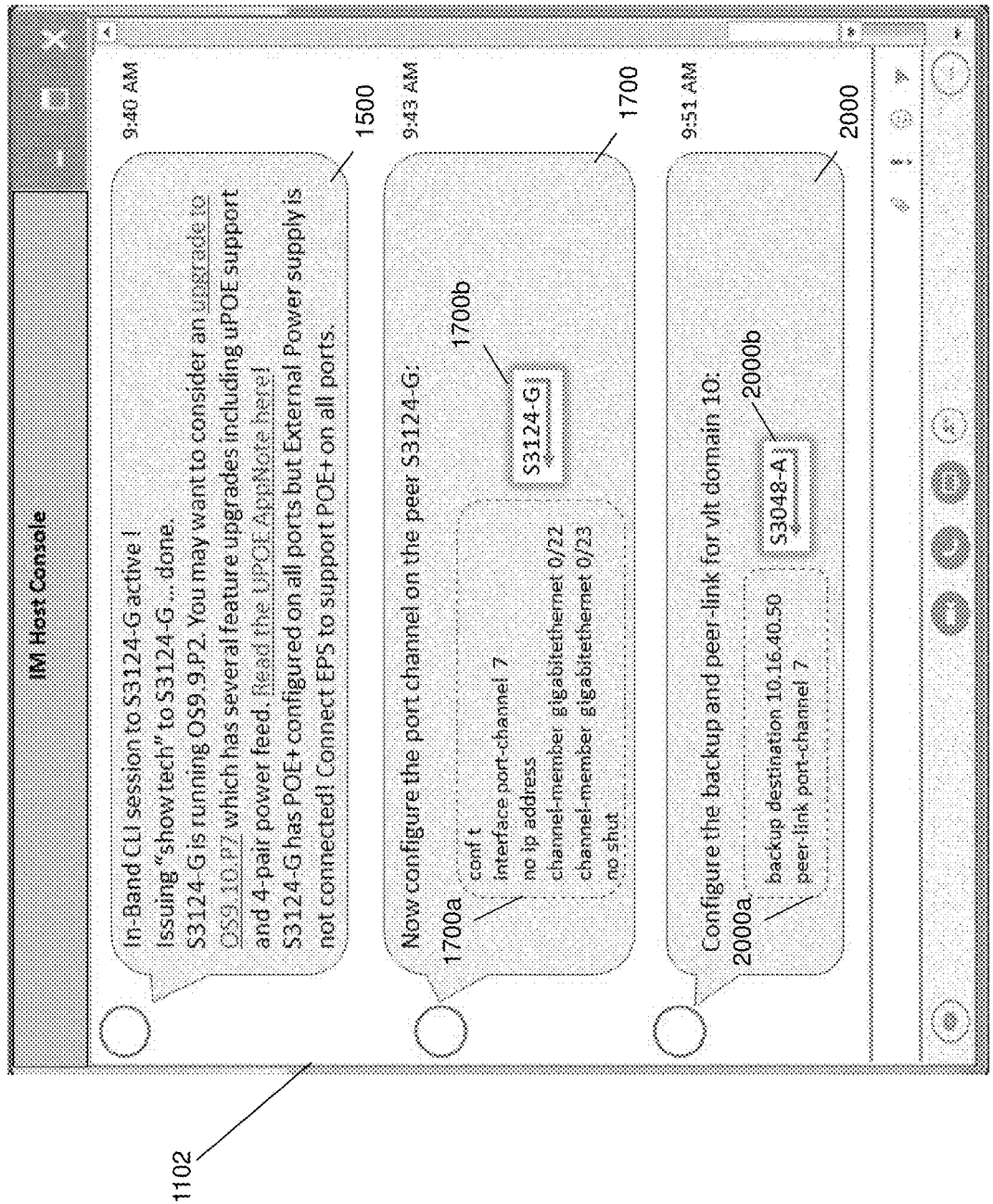
FIG. 20 is a screen shot illustrating an embodiment of an IM host console window displayed on the primary management device in the configuration support system of FIG. 9 during the method of FIG. 8.
Figure 21:
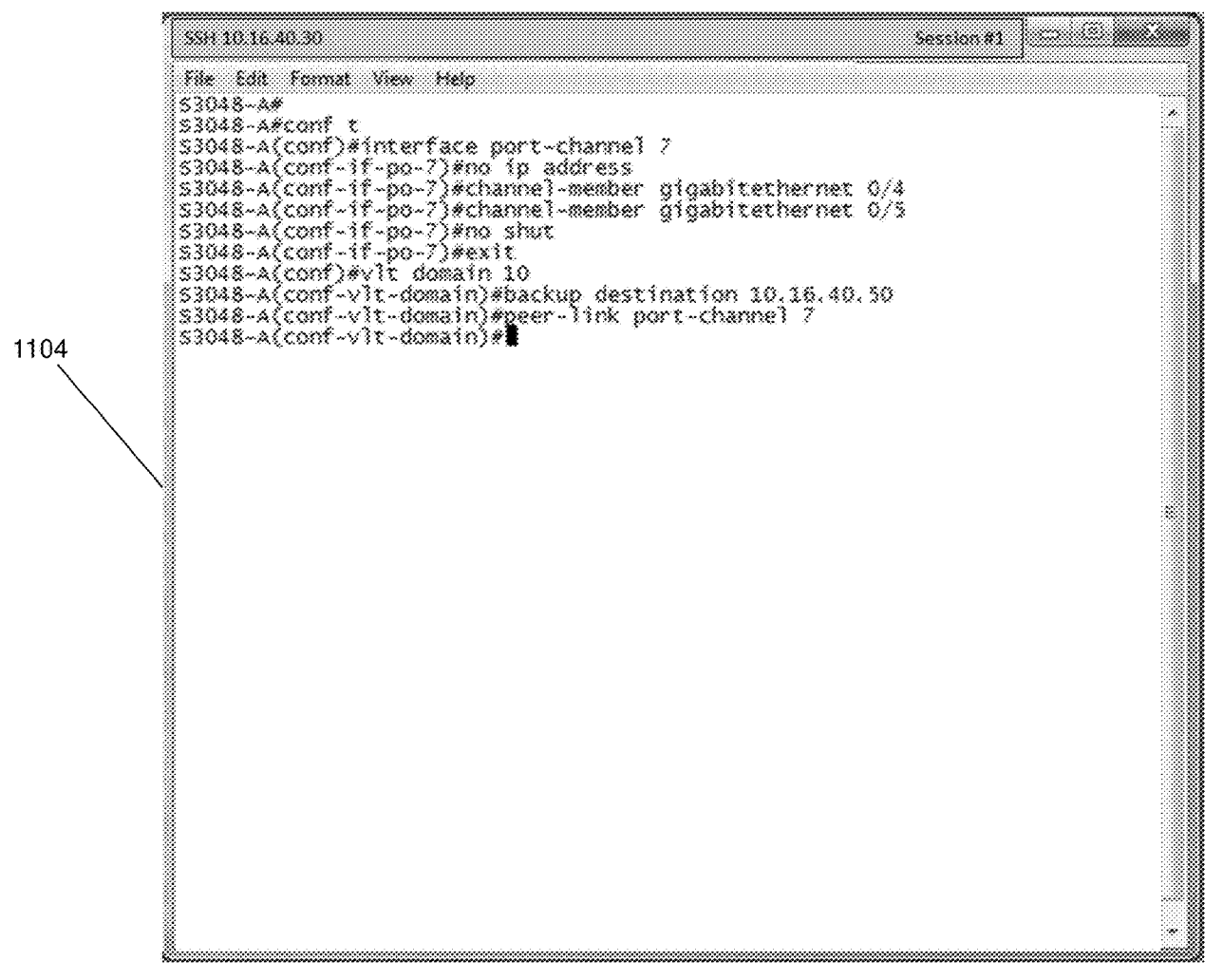

Referring now to FIG. 20, the instant messaging host console window 1102 is illustrated that includes the automated configuration support application message 2000 sent to the user via the messaging session, and one of skill in the art in possession of the present disclosure will recognize that the instant messaging window 1100 on the secondary management device 904 may display the same message 2000. As can be seen, the automated configuration support application message 2000 indicates to the user that they should now configure the network device 908 (e.g., "S3048-A") to provide a backup destination and peer-link given the configuration that was just provided in the configuration session with the network device 908. As can be seen, the automated configuration support application message 2000 includes a text configuration 2000*a*, along with a command execution element 2000*b* that indicates the network device 908 (e.g., "S3048-A") to indicate that the command execution element 2000*b* may be selected to automatically provide the configuration 2000*a* to the network device 908. In response to the user selecting the command execution element 2000*b*, the bridging engine in the primary management device 902 may send the configuration 2000*a* to the configuration engine in the primary management device 902 to provide that configuration 2000*a* as part of the configuration session to the network device 908. For example, FIG. 21 illustrates the first CLI window 1104 following the selection of the command execution element 2000*b*, and the configuration 2000*a* has been automatically provided as part of the configuration session with the network device 908, and thus is displayed in the first CLI window 1104.

Figure 22:
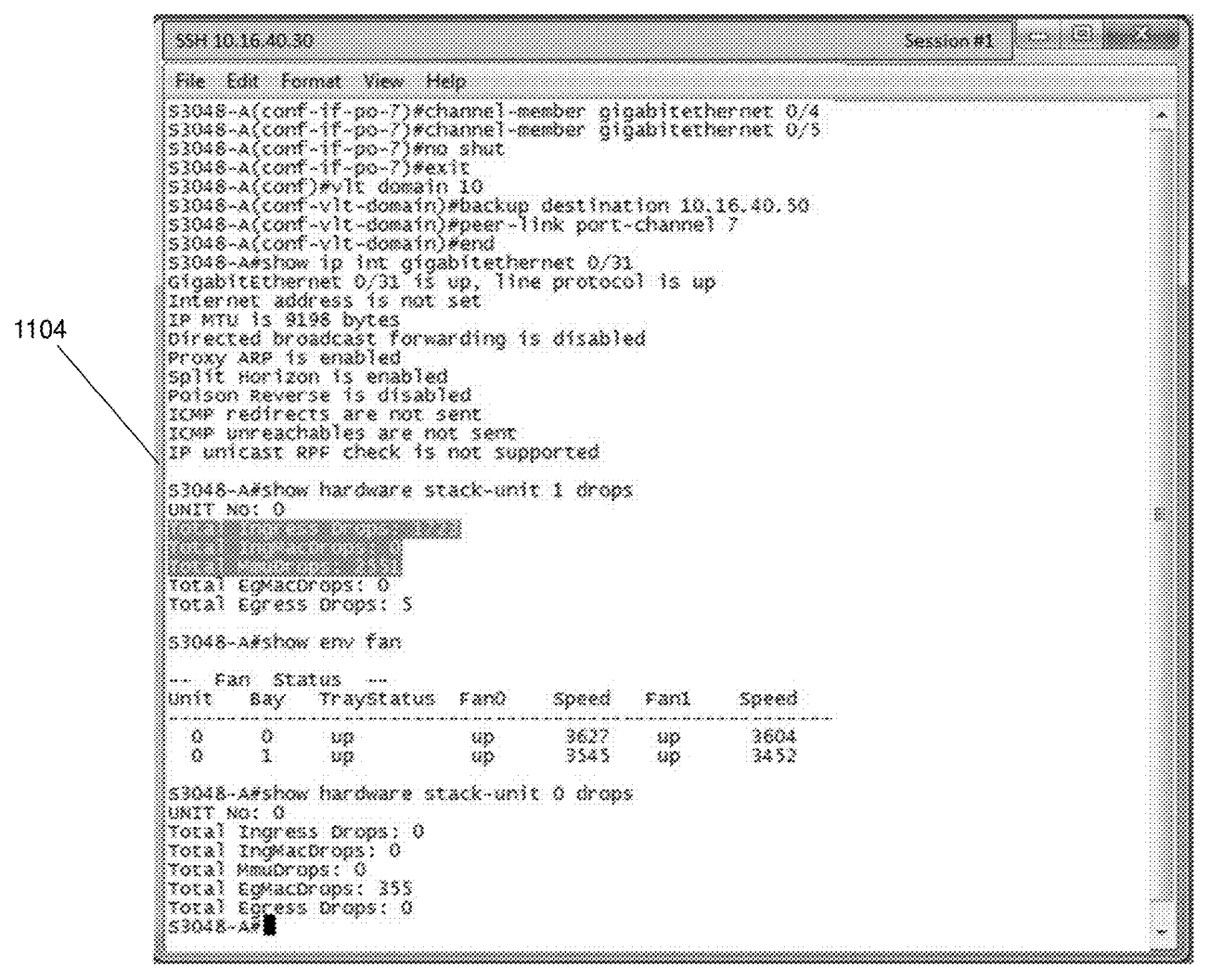
Figure 23:
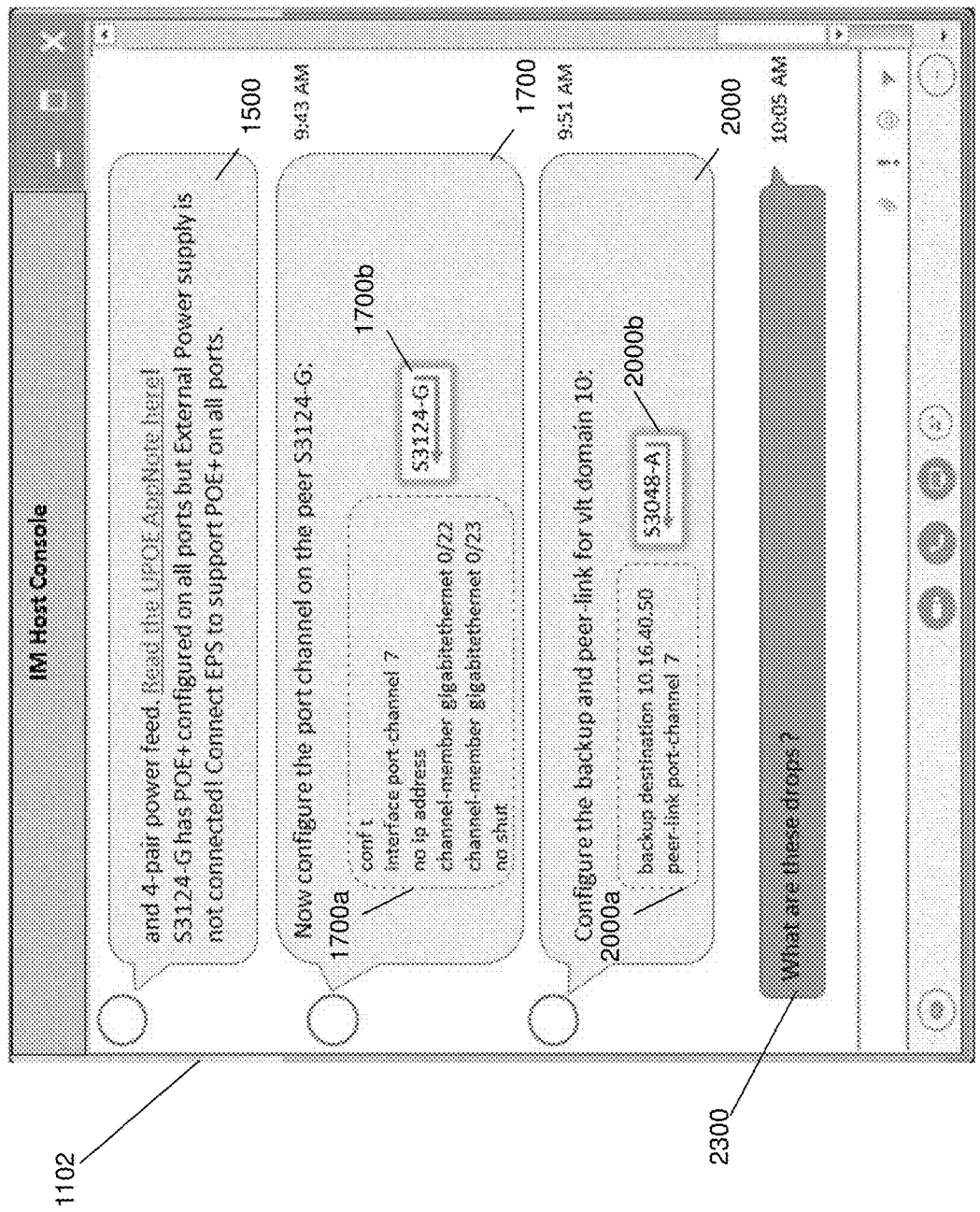
FIG. 23 is a screen shot illustrating an embodiment of an IM host console window displayed on the primary management device in the configuration support system of FIG. 9 during the method of FIG. 8.

Referring now to FIGS. 22 and 23, the first CLI window 1104 is illustrated after the user of the primary management device 902 has provided commands for the configuration session with the network device 908, and has selected responses from the network device 908 to get more information about those responses. As can be seen in FIG. 22, the user has provided commands including a "show ip int gigabitethernet 0/31" command, a "show hardware stack-unit 1 drops" command, a "show env fan" command, and a "show hardware stack-unit 0 drops" command. Furthermore, the user has selected (e.g., via a highlight in FIG. 22) responses from the network device 908 to the "show hardware stack-unit 1 drops" command. Further still, as can be seen in FIG. 23, the user has provided a user message 2300 in the instant messaging host console window 1102 asking for more information about the responses highlighted in the first CLI window 1104 (e.g., "What are these drops?"). In response to receiving the user message 2300 via the messaging session, the automated configuration support application in the support device 916 may determine a current active/selected configuration session window (e.g., the first CLI window 1104) based on data shared with the automated configuration support application by the bridging engine in the primary management device 902. The automated configuration support application in the support device 916 may then detect the highlighted text in the first CLI window 1104 (e.g., "Total Ingress Drops: 1723; Total IngMacDrops: 0; Total MmuDrops: 2551") based on data shared with the automated configuration support application by the bridging engine in the primary management device 902. The automated configuration support application in the support device 916 may then determine the command related to the highlighted text ("show hardware stack-unit 1 drops; UNIT No: 0"), and determine the parameters that are of interest ("Ingress Drops"; "IngMacDrops"; and "MmuDrops").

Figure 24:
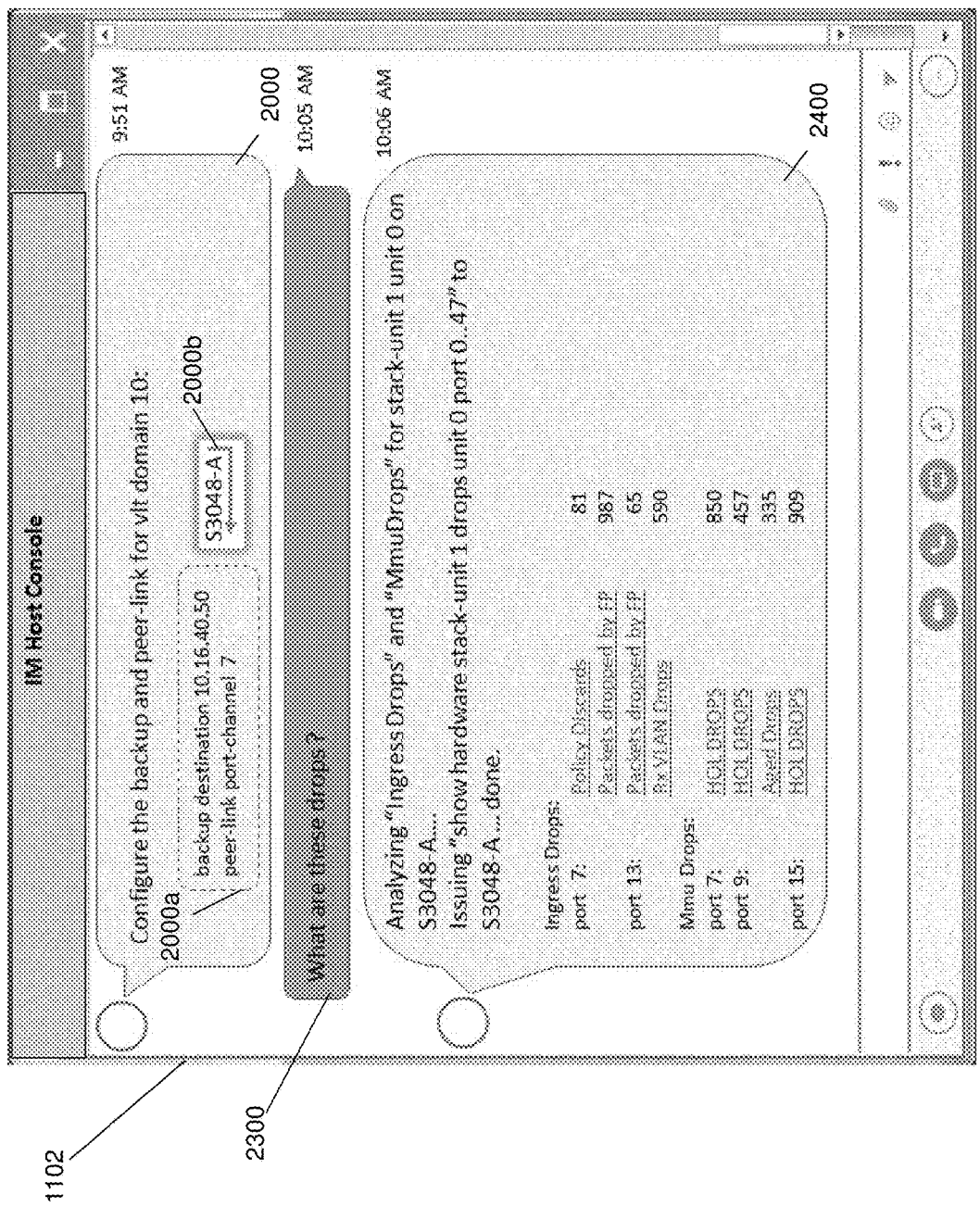
FIG. 24 is a screen shot illustrating an embodiment of an IM host console window displayed on the primary management device in the configuration support system of FIG. 9 during the method of FIG. 8.

Once the automated configuration support application has determined the context (the configuration session, the selected object, the parameters), the automated configuration support application may use its internal tables to determine which commands may help in providing more detailed information about the identified parameters. The automated configuration support application may then issue a series of in-band commands to the configuration session for network device 908 for all the ports (e.g., using "show hardware stack-unit 1 drops; unit no. 0; port no. 0", "show hardware stack-unit 1 drops; unit no. 0; port no. 1", and up to "show hardware stack-unit 1 drops; unit no. 0; port no. 47", collate the results, and provide the results as an automated configuration support application message 2400 with embedded links for further documentation reference and/or analysis by the user. For example, FIG. 24 illustrates the instant messaging host console window 1102 displaying an automated support application message 2400 that indicates that the "Ingress Drops" and "MmuDrops" for the network device 908 were analyzed, that commands were issued to the network device 908, and that includes the results of the analysis with embedded links for further documentation reference and/or analysis by the user.

Thus, systems and methods have been described that provide in-band communication between a support device and a management device that enables an automated configuration support application on the support device to transparently access configuration session(s) provided for the networking device(s) in order to query the network device(s), receive responses from the networking device(s), snoop user activity during the configuration session(s) to better correlate support queries from the user with network device state, and provide pro-active, timely, and accurate support responses to the user. The systems and methods of the present disclosure provide for more efficient support due to the automated support application being provided with the user's perspective of the network device(s) via the queries to the network device(s) in-band via the messaging session (without requiring the user to execute commands in the configuration sessions and copy the responses to the messaging session) in order to get the more accurate view of the network device, the tracking of user actions during the configuration session and the pushing of those user actions to the support device, and the mirroring of user CLI commands and network device responses to the automated support application using the in-band communications.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A configuration support system, comprising:
 a support device that includes an automated support application;

a network device; and at least one management device that is coupled to the network device and the support device, wherein the at least one management device includes:

a processing system; and a memory system that is couple to the processing system and that include instruction that, when executed by the processing system, cause the processing system to provide a management engine that is configure to:

create a configuration session with the network device and, in response, display a configuration window;

create a messaging session with the automated support application and, in response, display a messaging window;

send, to the automated support application via the messaging session, data generated during the configuration session;

receive, from the automated support application via the messaging session, an automated support application command directed to the network device; and execute, on the network device via the configuration session, the automated support application command.

2. The configuration support system of claim 1, wherein the at least one management device is configured to:

receive, from a user via the configuration window, a user command that is directed to the network device and displayed in the configuration window, wherein the automated support application command that was executed on the network device is not displayed in the configuration window based on the automated support application command being received from the automated support application.

3. The configuration support system of claim 1, wherein the at least one management device is configured to:

receive, from a user via the messaging window, a user message that is directed to the automated support application and displayed in the messaging window, wherein the automated support application command that was received from the automated support application is not displayed in the messaging window based on the automated support application command being directed to the network device.

4. The configuration support system of claim 1, wherein the at least one management device is configured to:

receive, from the automated support application via the messaging session, an automated support application message that is directed to a user; and displaying the automated support application message in the messaging window based on the automated support application message being directed to the user.

5. The configuration support system of claim 4, wherein the automated support application message includes a command execution element, and wherein the at least one management device is configured to:

receive, in response to a selection of the command execution element, the automated support application command.

6. The configuration support system of claim 1, wherein the sending the data generated during the configuration session includes:

determining at least one user selected element in the configuration window; and sending the at least one user selected element to the automated support application.

7. The configuration support system of claim 6, wherein the at least one management device is configured to:

receive, from the automated support application via the messaging session and in response to sending the at least one user selected element, an automated support application message that is directed to a user and that provides information about the at least one user selected element.

8. An Information Handling System (IHS), comprising:

a communication subsystem;

a processing system that is coupled to the communication subsystem; and a memory system that is coupled to the processing system and that includes instruction that, when executed by the processing system, cause the processing system to provide a management engine that is configured to:

create a configuration session with a network device and, in response, provide a configuration window for display;

create a messaging session with an automated support application and, in response, provide a messaging window for display;

send, through the communication subsystem and to the automated support application via the messaging session, data generated during the configuration session;

receive, through the communication subsystem and from the automated support application via the messaging session, an automated support application command directed to the network device; and execute, through the communication subsystem and on the network device via the configuration session, the automated support application command.

9. The IHS of claim 8, wherein the management engine is configured to:

receive, through the communication subsystem and from a user via the configuration window, a user command that is directed to the network device and displayed in the configuration window, wherein the automated support application command that was executed on the network device is not displayed in the configuration window based on the automated support application command being received from the automated support application.

10. The IHS of claim 8, wherein the management engine is configured to:

receive, through the communication subsystem and from a user via the messaging window, a user message that is directed to the automated support application and displayed in the messaging window, wherein the automated support application command that was received from the automated support application is not displayed in the messaging window based on the automated support application command being directed to the network device.

11. The IHS of claim 8, wherein the management engine is configured to:

receive, through the communication subsystem and from the automated support application via the messaging session, an automated support application message that is directed to a user; and displaying the automated support application message in the messaging window based on the automated support application message being directed to the user.

12. The IHS of claim 11, wherein the automated support application message includes a command execution element, and wherein the management engine is configured to:
receive, through the communication subsystem and in response to a selection of the command execution element, the automated support application command.

13. The IHS of claim 8, wherein the sending the data generated during the configuration session includes:
determining at least one user selected element in the configuration window; and
sending the at least one user selected element to the automated support application.

14. The IHS of claim 13, wherein the management engine is configured to:
receive, through the communication subsystem and from the automated support application via the messaging session and in response to sending the at least one user selected element, an automated support application message that is directed to a user and that provides information about the at least one user selected element.

15. A method for providing configuration support, comprising:
creating, by a management device, a configuration session with a network device and, in response, displaying a configuration window;
creating, by the management device, a messaging session with an automated support application and, in response, displaying a messaging window;
sending, by the management device to the automated support application via the messaging session, data generated during the configuration session;
receiving, by the management device from the automated support application via the messaging session, an automated support application command directed to the network device; and
executing, by the management device on the network device via the configuration session, the automated support application command.

16. The method of claim 15, further comprising:
receiving, by the management device from a user via the configuration window, a user command that is directed to the network device and displayed in the configuration window,
wherein the automated support application command that was executed on the network device is not displayed in the configuration window based on the automated support application command being received from the automated support application.

17. The method of claim 15, further comprising:
receiving, by the management device from a user via the messaging window, a user message that is directed to the automated support application and displayed in the messaging window,
wherein the automated support application command that was received from the automated support application is not displayed in the messaging window based on the automated support application command being directed to the network device.

18. The method of claim 15, further comprising:
receiving, by the management device from the automated support application via the messaging session, an automated support application message that is directed to a user; and
displaying, by the management device, the automated support application message in the messaging window based on the automated support application message being directed to the user.

19. The method of claim 18, wherein the automated support application message includes a command execution element, and wherein the method further comprises:
receiving, by the management device in response to a selection of the command execution element, the automated support application command.

20. The method of claim 15, wherein the sending the data generated during the configuration session includes:
determining, by the management device, at least one user selected element in the configuration window; and
sending, by the management device, the at least one user selected element to the automated support application, and wherein the method further comprises:
receiving, by the management device from the automated support application via the messaging session and in response to sending the at least one user selected element, an automated support application message that is directed to a user and that provides information about the at least one user selected element.

* * * * *